(12) United States Patent
Foster et al.

(10) Patent No.: US 12,521,242 B2
(45) Date of Patent: Jan. 13, 2026

(54) MOTORIZED MEDICAL DEVICE DELIVERY SYSTEM WITH MANUAL BAILOUT

(71) Applicant: BOSTON SCIENTIFIC SCIMED, INC., Maple Grove, MN (US)

(72) Inventors: Daniel J. Foster, Lino Lakes, MN (US); Christopher Jay Scheff, Elk River, MN (US); Bradley S. Swehla, Eagan, MN (US); Eric Gagner, Minnetonka, MN (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 1000 days.

(21) Appl. No.: 17/583,500

(22) Filed: Jan. 25, 2022

(65) Prior Publication Data

US 2022/0233315 A1     Jul. 28, 2022

Related U.S. Application Data

(60) Provisional application No. 63/141,749, filed on Jan. 26, 2021.

(51) Int. Cl.
*A61F 2/24* (2006.01)
*A61F 2/95* (2013.01)
*A61F 2/962* (2013.01)

(52) U.S. Cl.
CPC .......... *A61F 2/2493* (2013.01); *A61F 2/2436* (2013.01); *A61F 2/95* (2013.01);
(Continued)

(58) Field of Classification Search
CPC ..... A61M 2025/09116; A61M 25/0136; A61B 1/0052; A61B 1/00066; A61B 2018/0091;
(Continued)

(56) References Cited

U.S. PATENT DOCUMENTS 3,674,014 A   7/1972   Tillander
4,798,598 A   1/1989   Bonello et al.
(Continued)

FOREIGN PATENT DOCUMENTS

EP   0778040 A2   6/1997
EP   1168986 A1   1/2002
(Continued)

OTHER PUBLICATIONS

International Search Report and Written Opinion dated Mar. 2, 2018 for International Application No. PCT/US2017/062113.
(Continued)

*Primary Examiner* — Sarah W Aleman
*Assistant Examiner* — Mikail A Mannan
(74) *Attorney, Agent, or Firm* — Seager, Tufte & Wickhem LLP

(57) ABSTRACT

An example system for delivering an implantable medical device is disclosed. The system includes a handle housing having a distal end region, a proximal end region and an inner cavity. The system also includes a power supply disposed within the handle, the power supply coupled to a first and second electric motors. The system also includes a first linear screw coupled to both the first electric motor and an actuation shaft. The system also includes a second linear screw coupled to both the second electric motor and an outer shaft. Further, the first electric motor is configured to be disengaged from first linear screw such that a first tool can be used to engage the first linear screw and the second electric motor is configured to be disengaged from second linear screw such that the first tool can be used to engage the second linear screw.

10 Claims, 17 Drawing Sheets

(52) U.S. Cl.
CPC ..... *A61F 2002/9511* (2013.01); *A61F 2/9517* (2020.05); *A61F 2002/9534* (2013.01); *A61F 2/962* (2013.01)

(58) Field of Classification Search
CPC .......... A61F 2/95; A61F 2/962; A61F 2/9517; A61F 2002/9511; A61F 2002/9534
See application file for complete search history.

(56) References Cited

U.S. PATENT DOCUMENTS

| | | | |
|---|---|---|---|
| 4,955,384 A | 9/1990 | Taylor et al. |
| 4,985,022 A | 1/1991 | Fearnot et al. |
| 4,998,923 A | 3/1991 | Samson et al. |
| 5,003,989 A | 4/1991 | Taylor et al. |
| 5,035,706 A | 7/1991 | Giantureo et al. |
| 5,095,915 A | 3/1992 | Engelson |
| 5,315,996 A | 5/1994 | Lundquist |
| 5,406,960 A | 4/1995 | Corso, Jr. |
| 5,437,288 A | 8/1995 | Schwartz et al. |
| 5,570,701 A | 11/1996 | Ellis et al. |
| 5,599,492 A | 2/1997 | Engelson |
| 5,665,115 A | 9/1997 | Cragg |
| 5,746,701 A | 5/1998 | Noone |
| 5,749,837 A | 5/1998 | Palermo et al. |
| 5,769,796 A | 6/1998 | Palermo et al. |
| 5,772,609 A | 6/1998 | Nguyen et al. |
| 5,776,080 A | 7/1998 | Thome et al. |
| 5,800,456 A | 9/1998 | Maeda et al. |
| 5,833,632 A | 11/1998 | Jacobsen et al. |
| 5,902,254 A | 5/1999 | Magram |
| 5,931,830 A | 8/1999 | Jacobsen et al. |
| 5,951,494 A | 9/1999 | Wang et al. |
| 6,001,068 A | 12/1999 | Uchino et al. |
| 6,017,319 A | 1/2000 | Jacobsen et al. |
| 6,139,510 A | 10/2000 | Palermo |
| 6,221,096 B1 | 4/2001 | Aiba et al. |
| 6,254,628 B1 | 7/2001 | Wallace et al. |
| 6,273,876 B1 | 8/2001 | Klima et al. |
| 6,398,776 B1 | 6/2002 | Sekino et al. |
| 6,565,597 B1 | 5/2003 | Fearnot et al. |
| 6,606,921 B2 | 8/2003 | Noetzold |
| 6,739,787 B1 | 5/2004 | Bystrom |
| 6,764,503 B1 | 7/2004 | Ishimaru |
| 6,918,882 B2 | 7/2005 | Skujins et al. |
| 6,921,397 B2 | 7/2005 | Corcoran et al. |
| 7,055,656 B2 | 6/2006 | Drew |
| 7,074,197 B2 | 7/2006 | Reynolds et al. |
| 7,338,495 B2 | 3/2008 | Adams |
| 7,413,563 B2 | 8/2008 | Corcoran et al. |
| 7,533,906 B2 | 5/2009 | Luettgen et al. |
| 7,540,865 B2 | 6/2009 | Griffin et al. |
| 7,579,550 B2 | 8/2009 | Dayton et al. |
| 7,618,379 B2 | 11/2009 | Reynolds et al. |
| 7,625,364 B2 | 12/2009 | Corcoran et al. |
| 7,780,611 B2 | 8/2010 | Griego et al. |
| 7,784,376 B2 | 8/2010 | Wen |
| 7,824,345 B2 | 11/2010 | Euteneuer et al. |
| 7,841,994 B2 | 11/2010 | Skujins et al. |
| 7,850,623 B2 | 12/2010 | Griffin et al. |
| 7,854,109 B2 | 12/2010 | Zubiate et al. |
| 7,914,466 B2 | 3/2011 | Davis et al. |
| 7,914,467 B2 | 3/2011 | Layman et al. |
| 7,918,080 B2 | 4/2011 | Zubiate et al. |
| 7,930,040 B1 * | 4/2011 | Kelsch ............... B25B 27/143 600/375 |
| 7,993,286 B2 | 8/2011 | Reynolds et al. |
| 8,022,331 B2 | 9/2011 | Reynolds et al. |
| 8,047,236 B2 | 11/2011 | Perry |
| 8,048,004 B2 | 11/2011 | Davis et al. |
| 8,048,060 B2 | 11/2011 | Griffin et al. |
| 8,080,053 B2 | 12/2011 | Satasiya et al. |
| 8,099,939 B2 | 1/2012 | Zubiate et al. |
| 8,100,031 B2 | 1/2012 | Zubiate et al. |
| 8,105,246 B2 | 1/2012 | Voeller et al. |
| 8,124,876 B2 | 2/2012 | Dayton et al. |
| 8,137,293 B2 | 3/2012 | Zhou et al. |
| 8,147,534 B2 | 4/2012 | Berez et al. |
| 8,157,751 B2 | 4/2012 | Adams et al. |
| 8,182,465 B2 | 5/2012 | Griffin et al. |
| 8,192,422 B2 | 6/2012 | Zubiate et al. |
| 8,197,419 B2 | 6/2012 | Field et al. |
| 8,231,551 B2 | 7/2012 | Griffin et al. |
| 8,257,279 B2 | 9/2012 | Davis et al. |
| 8,292,829 B2 | 10/2012 | Griego et al. |
| 8,317,777 B2 | 11/2012 | Zubiate et al. |
| 8,328,868 B2 | 12/2012 | Paul et al. |
| 8,376,865 B2 | 2/2013 | Forster et al. |
| 8,376,961 B2 | 2/2013 | Layman et al. |
| 8,377,035 B2 | 2/2013 | Zhou et al. |
| 8,397,481 B2 | 3/2013 | Zubiate et al. |
| 8,409,114 B2 | 4/2013 | Parins |
| 8,414,506 B2 | 4/2013 | Reynolds et al. |
| 8,425,408 B2 | 4/2013 | Boulais et al. |
| 8,443,692 B2 | 5/2013 | Zubiate et al. |
| 8,449,526 B2 | 5/2013 | Snyder et al. |
| 8,459,138 B2 | 6/2013 | Zubiate et al. |
| 8,475,366 B2 | 7/2013 | Boulais et al. |
| 8,485,992 B2 | 7/2013 | Griffin et al. |
| 8,535,219 B2 | 9/2013 | Smith et al. |
| 8,535,243 B2 | 9/2013 | Shireman |
| 8,551,020 B2 | 10/2013 | Chen et al. |
| 8,551,021 B2 | 10/2013 | Voeller et al. |
| 8,556,914 B2 | 10/2013 | Vrba |
| 8,608,648 B2 | 12/2013 | Banik et al. |
| 8,622,894 B2 | 1/2014 | Banik et al. |
| 8,636,716 B2 | 1/2014 | Griffin et al. |
| 8,656,697 B2 | 2/2014 | Zubiate et al. |
| 8,677,602 B2 | 3/2014 | Dayton et al. |
| 8,758,268 B2 | 6/2014 | Bown et al. |
| 8,784,337 B2 | 7/2014 | Voeller et al. |
| 8,795,202 B2 | 8/2014 | Northrop et al. |
| 8,795,254 B2 | 8/2014 | Ayman et al. |
| 8,821,477 B2 | 9/2014 | Northrop et al. |
| 8,833,197 B2 | 9/2014 | Zubiate et al. |
| 8,845,552 B2 | 9/2014 | Griego et al. |
| 8,864,654 B2 | 10/2014 | Kleiner et al. |
| 8,870,790 B2 | 10/2014 | Davis et al. |
| 8,900,163 B2 | 12/2014 | Jacobsen et al. |
| 8,915,865 B2 | 12/2014 | Jacobsen et al. |
| 8,932,235 B2 | 1/2015 | Jacobsen et al. |
| 8,936,558 B2 | 1/2015 | Jacobsen et al. |
| 8,939,916 B2 | 1/2015 | Jacobsen et al. |
| 8,945,096 B2 | 2/2015 | Zubiate et al. |
| 9,005,114 B2 | 4/2015 | Zubiate et al. |
| 9,011,318 B2 | 4/2015 | Choset et al. |
| 9,023,011 B2 | 5/2015 | Griffin et al. |
| 9,072,874 B2 | 7/2015 | Northrop et al. |
| 9,370,432 B2 | 6/2016 | Bennett et al. |
| 9,375,234 B2 | 6/2016 | Vrba |
| 9,386,911 B2 | 7/2016 | Zubiate et al. |
| 9,387,308 B2 | 7/2016 | Hinchliffe et al. |
| 9,387,309 B2 | 7/2016 | Parodi et al. |
| 9,402,682 B2 | 8/2016 | Worrell et al. |
| 9,993,360 B2 | 6/2018 | Shalev et al. |
| 10,092,426 B2 | 10/2018 | McHugo |
| 10,258,465 B2 | 4/2019 | Salahieh et al. |
| 10,646,365 B2 | 5/2020 | Berra et al. |
| 11,266,518 B2 | 3/2022 | Poppe et al. |
| 2001/0037141 A1 | 11/2001 | Yee et al. |
| 2003/0069520 A1 | 4/2003 | Skujins et al. |
| 2003/0069521 A1 | 4/2003 | Reynolds et al. |
| 2004/0064179 A1 | 4/2004 | Linder et al. |
| 2004/0193244 A1 | 9/2004 | Hartley et al. |
| 2004/0220499 A1 | 11/2004 | Griego et al. |
| 2004/0243143 A1 | 12/2004 | Corcoran et al. |
| 2005/0080400 A1 | 4/2005 | Corcoran et al. |
| 2005/0090848 A1 | 4/2005 | Adams |
| 2005/0267444 A1 | 12/2005 | Griffin et al. |
| 2006/0111615 A1 | 5/2006 | Danitz et al. |
| 2006/0122537 A1 | 6/2006 | Reynolds et al. |
| 2006/0179966 A1 | 8/2006 | Kuo |
| 2006/0189896 A1 | 8/2006 | Davis et al. |
| 2007/0049902 A1 | 3/2007 | Griffin et al. |

(56) References Cited

U.S. PATENT DOCUMENTS

| | | |
|---|---|---|
| 2007/0066900 A1 | 3/2007 | O'Keeffe |
| 2007/0083132 A1 | 4/2007 | Sharrow |
| 2007/0100285 A1 | 5/2007 | Griffin et al. |
| 2007/0114211 A1 | 5/2007 | Reynolds et al. |
| 2007/0135734 A1 | 6/2007 | Reynolds et al. |
| 2007/0233043 A1 | 10/2007 | Dayton et al. |
| 2007/0244414 A1 | 10/2007 | Reynolds et al. |
| 2007/0265637 A1 | 11/2007 | Andreas et al. |
| 2008/0009829 A1 | 1/2008 | Ta et al. |
| 2008/0064989 A1 | 3/2008 | Chen et al. |
| 2008/0077119 A1 | 3/2008 | Snyder et al. |
| 2008/0194994 A1 | 8/2008 | Bown et al. |
| 2008/0205980 A1 | 8/2008 | Zubiate et al. |
| 2008/0245173 A1 | 10/2008 | Schwerin et al. |
| 2008/0255655 A1 | 10/2008 | Kusleika et al. |
| 2008/0262474 A1 | 10/2008 | Northrop |
| 2009/0036833 A1 | 2/2009 | Parins |
| 2009/0043228 A1 | 2/2009 | Northrop et al. |
| 2009/0043283 A1 | 2/2009 | Turnlund et al. |
| 2009/0143768 A1 | 6/2009 | Parodi et al. |
| 2009/0156999 A1 | 6/2009 | Adams et al. |
| 2009/0171151 A1 | 7/2009 | Choset et al. |
| 2009/0312606 A1 | 12/2009 | Dayton et al. |
| 2009/0319037 A1 | 12/2009 | Rowe et al. |
| 2010/0063480 A1 | 3/2010 | Shireman |
| 2010/0076266 A1 | 3/2010 | Boulais et al. |
| 2010/0080892 A1 | 4/2010 | O'Brien et al. |
| 2010/0145308 A1 | 6/2010 | Layman et al. |
| 2010/0234933 A1 | 9/2010 | Punga et al. |
| 2010/0249655 A1 | 9/2010 | Lemon |
| 2010/0274187 A1 | 10/2010 | Argentine |
| 2010/0286566 A1 | 11/2010 | Griffin et al. |
| 2010/0294071 A1 | 11/2010 | Zubiate et al. |
| 2010/0305475 A1 | 12/2010 | Hinchliffe et al. |
| 2011/0056320 A1 | 3/2011 | Zubiate et al. |
| 2011/0082443 A1 | 4/2011 | Griffin et al. |
| 2011/0152613 A1 | 6/2011 | Zubiate et al. |
| 2011/0178588 A1 | 7/2011 | Haselby |
| 2011/0184241 A1 | 7/2011 | Zubiate et al. |
| 2011/0218620 A1 | 9/2011 | Meiri et al. |
| 2011/0257478 A1 | 10/2011 | Kleiner et al. |
| 2011/0264191 A1 | 10/2011 | Rothstein |
| 2012/0041411 A1 | 2/2012 | Horton et al. |
| 2012/0160537 A1 | 6/2012 | Wen |
| 2012/0265134 A1 | 10/2012 | Echarri et al. |
| 2013/0085562 A1 | 4/2013 | Rincon et al. |
| 2013/0123796 A1 | 5/2013 | Sutton et al. |
| 2013/0123912 A1 | 5/2013 | Tung et al. |
| 2013/0131775 A1 | 5/2013 | Hadley et al. |
| 2013/0144276 A1 | 6/2013 | Crisostomo et al. |
| 2014/0235361 A1 | 8/2014 | Forster et al. |
| 2015/0250481 A1 | 9/2015 | Chobotov |
| 2016/0100941 A1 | 4/2016 | Czyscon et al. |
| 2016/0184117 A1 | 6/2016 | Vad et al. |
| 2016/0256304 A1 | 9/2016 | Roeder et al. |
| 2016/0302921 A1 | 10/2016 | Gosal et al. |
| 2016/0317301 A1 | 11/2016 | Quadri et al. |
| 2018/0140323 A1 | 5/2018 | Foster et al. |
| 2019/0201030 A1* | 7/2019 | Shelton, IV ........ A61B 17/0469 |
| 2020/0015968 A1* | 1/2020 | Poppe ................... A61F 2/9517 |

FOREIGN PATENT DOCUMENTS

| | | |
|---|---|---|
| EP | 2455128 A2 | 5/2013 |
| JP | 2001522694 A | 11/2000 |
| JP | 2001504016 A | 3/2001 |
| JP | 2010088545 A | 4/2010 |
| JP | 2011087947 A | 5/2011 |
| JP | 2012501725 A | 1/2012 |
| JP | 2012223578 A | 11/2012 |
| JP | 2013517910 A | 5/2013 |
| JP | 2013524943 A | 6/2013 |
| JP | 2014508568 A | 4/2014 |
| JP | 2014513585 A | 6/2014 |
| JP | 5575840 B2 | 8/2014 |
| JP | 2015500063 A | 1/2015 |
| JP | 2015501680 A | 1/2015 |
| JP | 2016067915 A | 5/2016 |
| JP | 2017507744 A | 3/2017 |
| WO | 9820811 A1 | 5/1998 |
| WO | 9925280 A1 | 5/1999 |
| WO | 2006041612 A2 | 4/2006 |
| WO | 2006073581 A2 | 7/2006 |
| WO | 2010027485 A1 | 3/2010 |
| WO | 2011094527 A1 | 8/2011 |
| WO | 2011133486 A1 | 10/2011 |
| WO | 20120966687 A1 | 7/2012 |
| WO | 2012116368 A2 | 8/2012 |
| WO | 2016196933 A1 | 12/2016 |
| WO | 2018170092 A1 | 9/2018 |
| WO | 2018204558 A1 | 11/2018 |

OTHER PUBLICATIONS

International Search Report and Written Opinion dated May 25, 2018 for International Application No. PCT/US2018/022371.
International Search Report and Written Opinion dated Jun. 15, 2018 for International Application No. PCT/US2018/022377.
International Search Report and Written Opinion dated Aug. 31, 2018 for International Application No. PCT/US2018/030751.
Notice of Reasons for Refusal dated Dec. 14, 2021 for Japanese Patent Application No. 2020-0559546.

* cited by examiner

MOTORIZED MEDICAL DEVICE DELIVERY SYSTEM WITH MANUAL BAILOUT

CROSS REFERENCE TO RELATED APPLICATIONS

This application claims the benefit of priority of U.S. Provisional Application No. 63/141,749 filed Jan. 26, 2021, the entire disclosure of which is hereby incorporated by reference.

TECHNICAL FIELD

The present disclosure pertains to medical device delivery systems. More particularly, the present disclosure pertains to medical device delivery systems that include both one or more electrical motors as well as a mechanical bailout feature to deliver and deploy a medical device.

BACKGROUND

A wide variety of intracorporeal medical devices have been developed for medical use, for example, intravascular use. Some of these devices include guidewires, catheters, and the like. These devices are manufactured by any one of a variety of different manufacturing methods and may be used according to any one of a variety of methods. Of the known medical devices and methods, each has certain advantages and disadvantages. There is an ongoing need to provide alternative medical devices as well as alternative methods for manufacturing and using medical devices.

SUMMARY

This disclosure provides design, material, manufacturing method, and use alternatives for medical devices. An example system for delivering an implantable medical device includes a handle housing having a distal end region, a proximal end region and an inner cavity. The system also includes a power supply disposed within the cavity of the handle, the power supply coupled to a first electric drive motor and a second electric drive motor. The system also includes a first linear drive screw coupled to both the first electric drive motor and an actuation shaft within the cavity of the handle. The system also includes a second linear drive screw coupled to both the second electric drive motor and an outer shaft within the cavity of the handle. Further, the first electric drive motor is configured to be disengaged from first linear drive screw such that a first drive tool can be used to engage the first linear drive screw. Additionally, the second electric drive motor is configured to be disengaged from second linear drive screw such that the first drive tool can be used to engage the second linear drive screw.

Additionally or alternatively, further comprising an inner cavity access door disposed on a proximal end of the handle housing, and wherein the inner cavity access door is configured to be removed such that the first linear drive screw and the second linear drive screw may be accessed by the first drive tool.

Additionally or alternatively, wherein the inner cavity access door is coupled to the second electric drive motor such that removal of the inner cavity access door from the handle housing disengages the second electric drive motor from the second linear drive screw.

Additionally or alternatively, further comprising a release lever coupled to the handle, the first electric drive motor and a pull wire assembly.

Additionally or alternatively, wherein the pull wire assembly includes a pull wire attached to a latch, and wherein the latch is coupled to the inner cavity access door.

Additionally or alternatively, wherein the latch is configured to shift between a first position and a second position, and wherein the latch prevents the inner cavity access door from being released from the handle housing in the first position, and wherein shifting the latch from the first position to the second position releases the inner cavity access door from the handle housing.

Additionally or alternatively, wherein actuation of the release lever actuates the pull wire such that the pull wire shifts the latch from the first position to the second position.

Additionally or alternatively, wherein engaging the first drive tool with the first linear drive screw allows the first drive tool to manually rotate the first linear drive screw a first direction.

Additionally or alternatively, wherein manual rotation of the first linear drive screw in the first direction shifts the actuation shaft in a distal-to-proximal direction.

Additionally or alternatively, further comprising a second drive tool configured to engage the first linear drive screw, and wherein engaging the second drive tool with the first linear drive screw allows the second drive tool to manually rotate the first linear drive screw a second direction different than the first direction, and wherein the manual rotation of the first linear drive screw in the second direction shifts the actuation shaft in a proximal-to-distal direction.

Additionally or alternatively, wherein the first drive tool includes a first ratchet head, and wherein the first ratchet head is removable from a body portion of the first drive tool, and wherein removing the first ratchet head from the first drive tool uncovers a second engagement head.

Additionally or alternatively, wherein the second engagement head of the first drive tool is configured to engage the second linear drive screw.

Additionally or alternatively, wherein engaging the second engagement head of the first drive tool with the second linear drive screw allows the first drive tool to manually rotate the second linear drive screw a first direction, and wherein the manual rotation of the second linear drive screw in the first direction shifts the outer shaft in a proximal-to-distal direction.

Another system for delivering an implantable heart valve includes a tip assembly having a distal end region and a proximal end region, a guidewire shaft coupled to the distal end region of the tip assembly, a handle housing having a distal end region, a proximal end region and an inner cavity, wherein the handle housing is coupled to the guidewire shaft. The system also includes a first linear drive screw coupled to both a first electric drive motor and an actuation shaft within the cavity of the handle. The system also includes a second linear drive screw coupled to both a second electric drive motor and an outer shaft within the cavity of the handle, wherein the first electric drive motor is configured to be disengaged from first linear drive screw such that a first drive tool can be used to rotate the first linear drive screw and wherein the second electric drive motor is configured to be disengaged from second linear drive screw such that the first drive tool can be used to rotate the second linear drive screw.

Additionally or alternatively, wherein engaging the first drive tool with the first linear drive screw allows the first drive tool to manually rotate the first linear drive screw a first direction, and wherein the manual rotation of the first linear drive screw in the first direction shifts the actuation shaft in a distal-to-proximal direction.

Additionally or alternatively, further comprising a second drive tool configured to engage the first linear drive screw, and wherein engaging the second drive tool with the first linear drive screw allows the second drive tool to manually rotate the first linear drive screw a second direction different than the first direction, and wherein the manual rotation of the first linear drive screw in the second direction shifts the actuation shaft in a proximal-to-distal direction.

Additionally or alternatively, wherein the first drive tool includes a first ratchet head, and wherein the first ratchet head is removable from a body portion of the first drive tool, and wherein removing the first ratchet head from the first drive tool uncovers a second engagement head.

Additionally or alternatively, wherein the second engagement head of the first drive tool is configured to engage the second linear drive screw.

Another system for delivering an implantable heart valve includes a handle housing having a distal end region, a proximal end region and an inner cavity, wherein the handle housing is coupled to the guidewire shaft. The system also includes a first linear drive screw coupled to both a first electric drive motor and an actuation shaft within the cavity of the handle. The system also includes a second linear drive screw coupled to both a second electric drive motor and an outer shaft within the cavity of the handle, wherein the first electric drive motor is configured to be disengaged from first linear drive screw such that a first drive tool can be used to rotate the first linear drive screw a first direction. Further, a second drive tool can be used to rotate the first linear drive screw a second direction different from the first direction, wherein the first drive tool includes a second engagement head configured to rotate the second linear drive screw after the second electric drive motor is disengaged therefrom.

Additionally or alternatively, wherein the first drive tool includes a first ratchet head, and wherein the first ratchet head is removable from a body portion of the first drive tool, and wherein removing the first ratchet head from the first drive tool uncovers the second engagement head.

The above summary of some embodiments is not intended to describe each disclosed embodiment or every implementation of the present disclosure. The Figures, and Detailed Description, which follow, more particularly exemplify these embodiments.

BRIEF DESCRIPTION OF THE DRAWINGS

The disclosure may be more completely understood in consideration of the following detailed description in connection with the accompanying drawings, in which.

Figure 1:
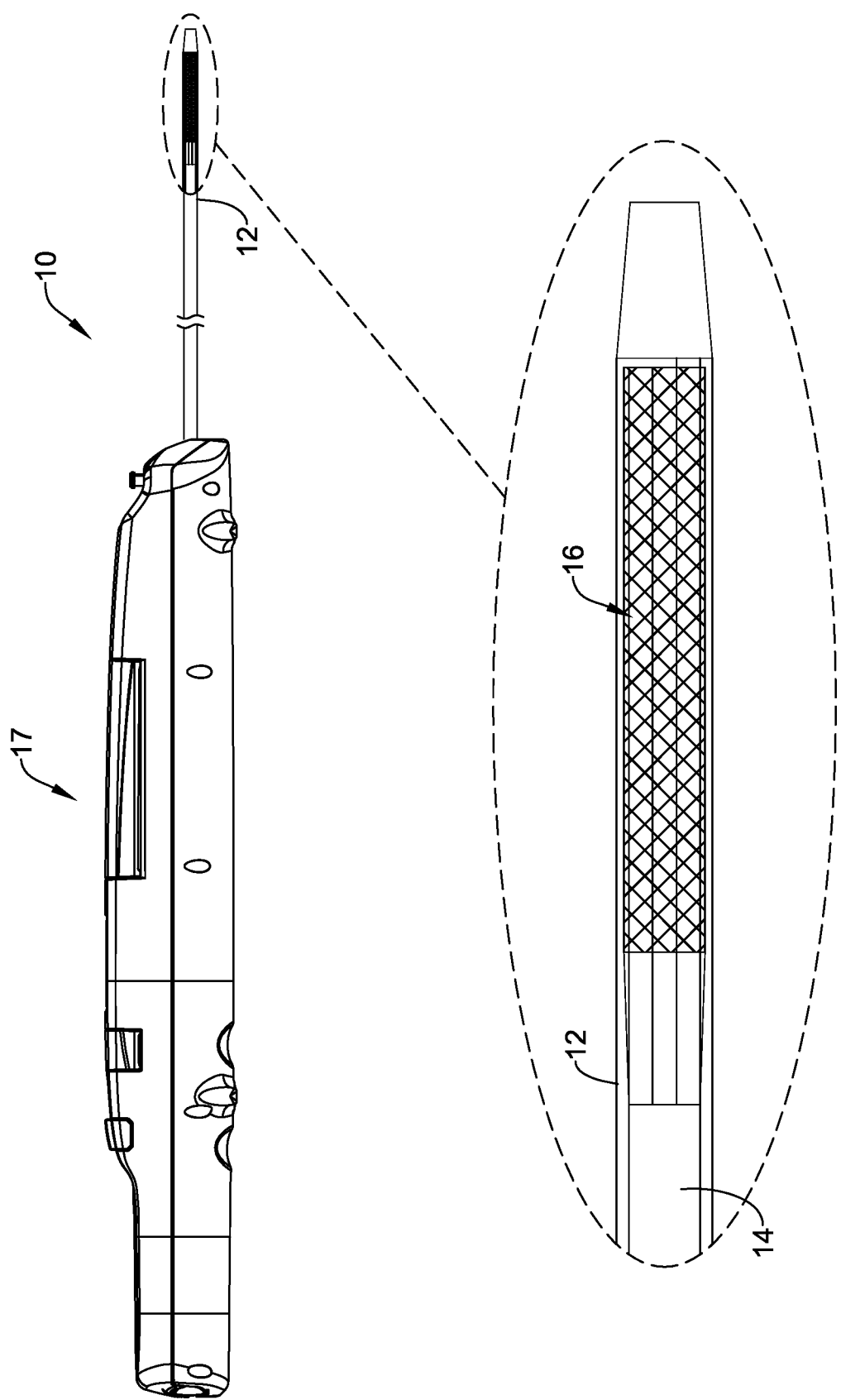
FIG. 1 is a side view of an example medical device delivery system.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DESCRIPTION

For the following defined terms, these definitions shall be applied, unless a different definition is given in the claims or elsewhere in this specification.

All numeric values are herein assumed to be modified by the term "about", whether or not explicitly indicated. The term "about" generally refers to a range of numbers that one of skill in the art would consider equivalent to the recited value (e.g., having the same function or result). In many instances, the terms "about" may include numbers that are rounded to the nearest significant figure.

The recitation of numerical ranges by endpoints includes all numbers within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

It is noted that references in the specification to "an embodiment", "some embodiments", "other embodiments", etc., indicate that the embodiment described may include one or more particular features, structures, and/or characteristics. However, such recitations do not necessarily mean that all embodiments include the particular features, structures, and/or characteristics. Additionally, when particular features, structures, and/or characteristics are described in connection with one embodiment, it should be understood that such features, structures, and/or characteristics may also be used connection with other embodiments whether or not explicitly described unless clearly stated to the contrary.

The following detailed description should be read with reference to the drawings in which similar elements in different drawings are numbered the same. The drawings, which are not necessarily to scale, depict illustrative embodiments and are not intended to limit the scope of the disclosure.

Diseases and/or medical conditions that impact the cardiovascular system are prevalent throughout the world. Traditionally, treatment of the cardiovascular system was often conducted by directly accessing the impacted part of the body. For example, treatment of a blockage in one or more of the coronary arteries was traditionally treated using coronary artery bypass surgery. As can be readily appreciated, such therapies are rather invasive to the patient and require significant recovery times and/or treatments. More recently, less invasive therapies have been developed. For example, therapies have been developed which allow a blocked coronary artery to be accessed and treated via a percutaneous catheter (e.g., angioplasty). Such therapies have gained wide acceptance among patients and clinicians.

Some relatively common medical conditions may include or be the result of inefficiency, ineffectiveness, or complete failure of one or more of the valves within the heart. For example, failure of the aortic valve or the mitral valve can have a serious effect on a human and could lead to serious health condition and/or death if not dealt with properly. Treatment of defective heart valves poses other challenges in that the treatment often requires the repair or outright replacement of the defective valve. Such therapies may be highly invasive to the patient. Disclosed herein are medical devices that may be used for delivering a medical device to a portion of the cardiovascular system in order to diagnose, treat, and/or repair the system. At least some of the medical devices disclosed herein may be used to deliver and implant a replacement heart valve (e.g., a replacement aortic valve, replacement mitral valve, etc.). In addition, the devices disclosed herein may deliver the replacement heart valve percutaneously and, thus, may be much less invasive to the patient. The devices disclosed herein may also provide a number of additional desirable features and benefits as described in more detail below.

The figures illustrate selected components and/or arrangements of a medical device system 10, shown schematically in FIG. 1 for example. It should be noted that in any given figure, some features of the medical device system 10 may not be shown, or may be shown schematically, for simplicity. Additional details regarding some of the components of the medical device system 10 may be illustrated in other figures in greater detail. A medical device system 10 may be used to deliver and/or deploy a variety of medical devices to a number of locations within the anatomy. In at least some embodiments, the medical device system 10 may include a replacement heart valve delivery system (e.g., a replacement aortic valve delivery system) that can be used for percutaneous delivery of a medical implant 16 (shown in the detailed view of FIG. 1), such as a replacement/prosthetic heart valve. This, however, is not intended to be limiting as the medical device system 10 may also be used for other interventions including valve repair, valvuloplasty, delivery of an implantable medical device (e.g., such as a stent, graft, etc.), and the like, or other similar interventions.

The medical device system 10 may generally be described as a catheter system that includes an outer sheath 12, an inner catheter 14 extending at least partially through a lumen of the outer sheath 12, and a medical implant 16 (e.g., a replacement heart valve implant) which may be coupled to the inner catheter 14 and disposed within a lumen of the outer sheath 12 during delivery of the medical implant 16. In some embodiments, a medical device handle 17 may be disposed at a proximal end of the outer sheath 12 and/or the inner catheter 14 and may include one or more actuation mechanisms associated therewith. In other words, one or more tubular members (e.g., the outer sheath 12, the inner catheter 14, etc.) may extend distally from the medical device handle 17. In general, the medical device handle 17 may be designed to manipulate the position of the outer sheath 12 relative to the inner catheter 14 and/or aid in the deployment of the medical implant 16.

In use, the medical device system 10 may be advanced percutaneously through the vasculature to a position adjacent to an area of interest and/or a treatment location. For example, in some embodiments, the medical device system 10 may be advanced through the vasculature to a position adjacent to a defective native valve (e.g., aortic valve, mitral valve, etc.). Alternative approaches to treat a defective aortic valve and/or other heart valve(s) are also contemplated with the medical device system 10. During delivery, the medical implant 16 may be generally disposed in an elongated and low profile "delivery" configuration within the lumen and/or a distal end of the outer sheath 12, as seen schematically in FIG. 1, for example. Once positioned, the outer sheath 12 may be retracted relative to the medical implant 16 and/or the inner catheter 14 to expose the medical implant 16. In some instances, the medical implant 16 may be self-expanding such that exposure of the medical implant 16 may deploy the medical implant 16. Alternatively, the medical implant 16 may be expanded/deployed using the medical device handle 17 in order to translate the medical implant 16 into a generally shortened and larger profile "deployed" configuration suitable for implantation within the anatomy. When the medical implant 16 is suitably deployed within the anatomy, the medical device system 10 may be disconnected, detached, and/or released from the medical implant 16 and the medical device system 10 can be removed from the vasculature, leaving the medical implant 16 in place in a "released" configuration.

It can be appreciated that during delivery and/or deployment of an implantable medical device (e.g., the medical implant 16), portions of the medical device system (e.g., the medical device system 10) may be required to be advanced through tortuous and/or narrow body lumens. Therefore, it may be desirable to utilize components and design medical delivery systems (e.g., such as the medical device system 10 and/or other medical devices) that reduce the profile of portions of the medical device while maintaining sufficient strength (compressive, torsional, etc.) and flexibility of the system as a whole.

Figure 2:
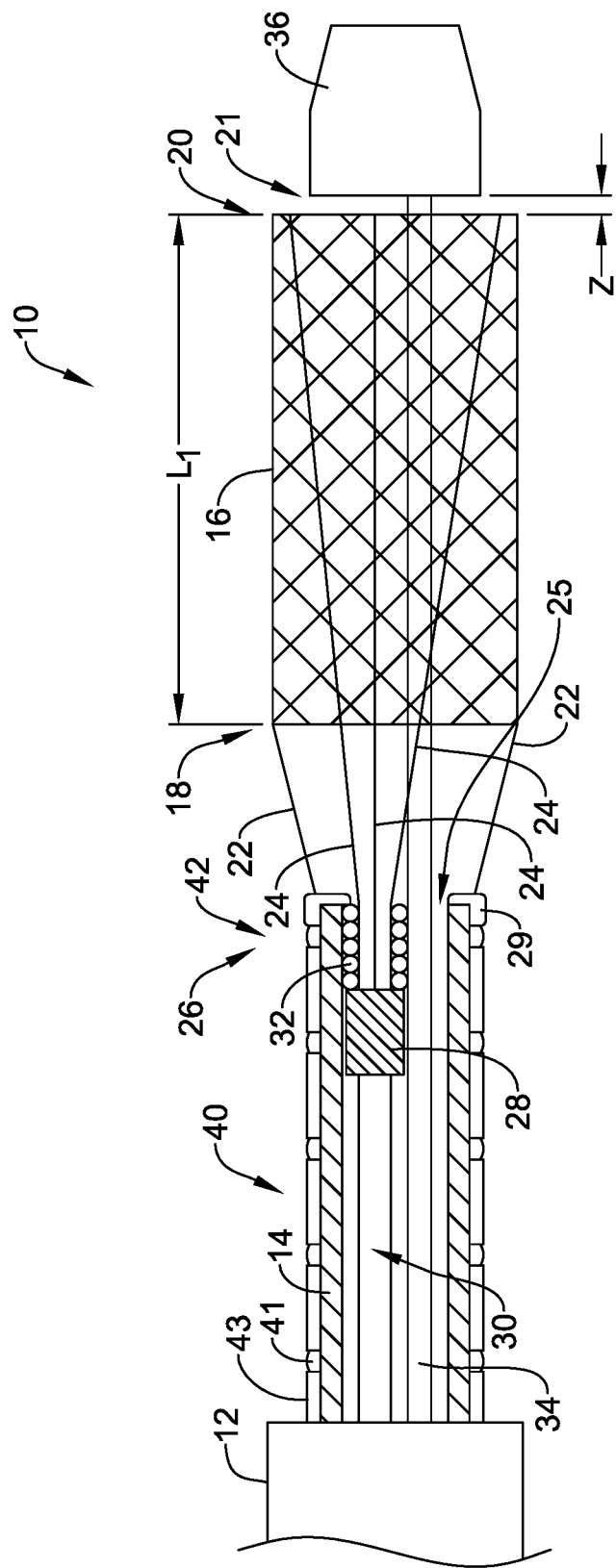
FIG. 2 is a partial cross-sectional view of a portion of the example medical device delivery system of FIG. 1.

FIG. 2 illustrates the medical device system 10 in a partially deployed configuration. As illustrated in FIG. 2, the outer sheath 12 of the medical device system 10 has been retracted in a proximal direction to a position proximal of the medical implant 16. In other words, the outer sheath 12 has been retracted (e.g., pulled back) in a proximal direction such that it uncovers the medical device implant 16 from a compact, low-profile delivery position to a partially-deployed position.

In at least some examples contemplated herein, the medical device implant 16 may be designed to self-expand once released from under the outer sheath 12. However, as shown in FIG. 2, the medical device system 10 may be designed such that the implant 16 may be restricted from expanding fully in the radial direction. For example, FIG. 2 shows medical device implant 16 having a partially deployed position denoted as a length "$L_1$."

FIG. 2 further illustrates that in some examples, the implant 16 may include one or more support members 22 coupled to the proximal end 18 of the implant 16. Further, FIG. 2 illustrates that in some examples, the implant 16 may include one or more translation members 24 coupled to the distal end 20 of the implant 16. Additionally, in some examples (such as that illustrated in FIG. 2), the translation members 24 and support members 22 may work together to maintain the implant in a partially-deployed position after the outer sheath 12 has been retracted to uncover the implant 16. For example, FIG. 2 illustrates that the support members 22 may be designed such that the distal end of each of the support members 22 may be coupled to the proximal end of the implant 16 and that the proximal end of each of the support members 22 may be coupled to the distal end of the inner catheter 14. For example, FIG. 2 illustrates that the proximal ends of the support members 22 may be attached to a containment fitting 29 which is rigidly fixed to the distal end of the inner catheter 14. It can be further appreciated that in some instances, the support members 22 may be designed to limit the proximal movement of the proximal end 18 of the implant 16 relative to the distal end of the inner catheter 14.

Additionally, the translation members 24 may be designed to translate in a distal-to-proximal direction such that the translation of the translation members (via operator manipulation at the handle, for example) may "pull" the distal end 20 of the implant closer to the proximal end 18 of the implant 16.

Figure 3:
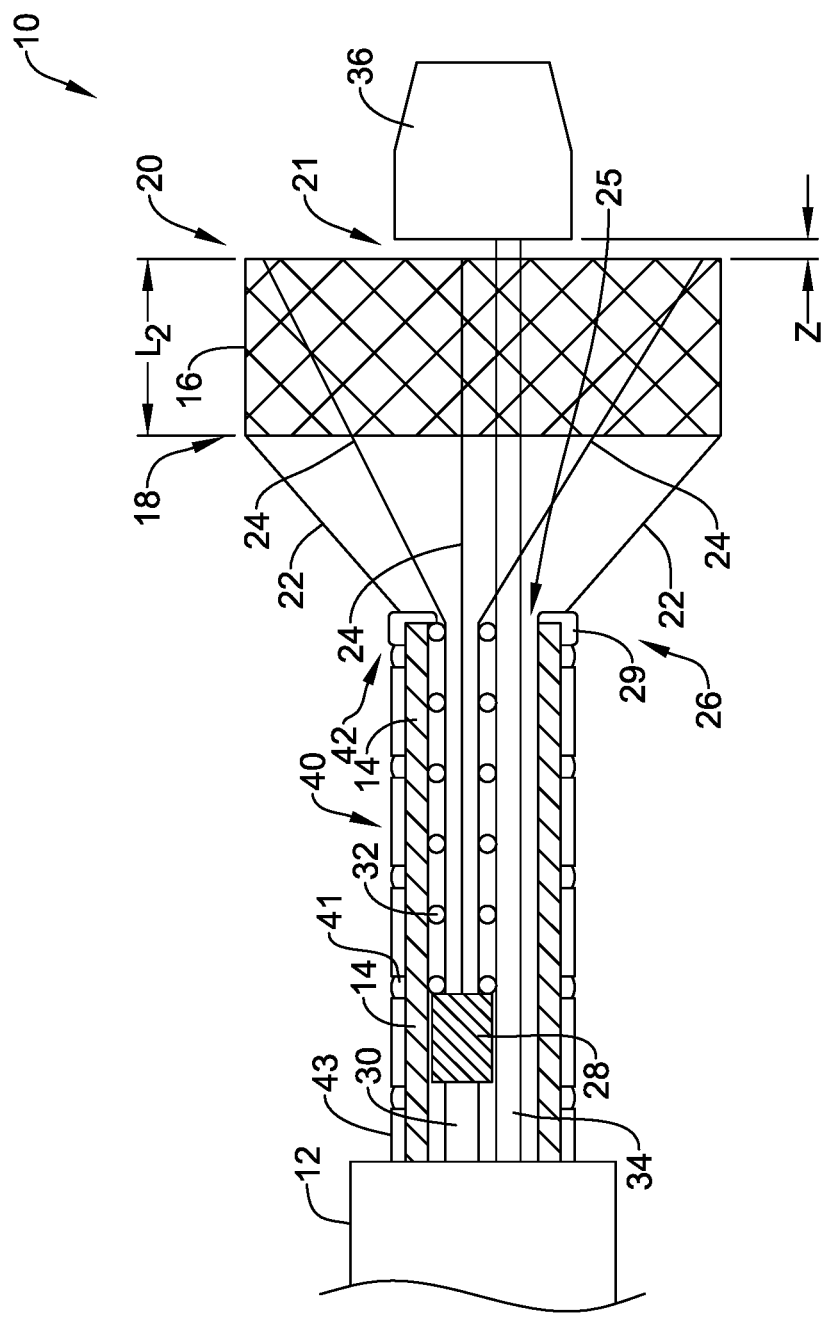
FIG. 3 is a partial cross-sectional view of a portion of the example medical device delivery system of FIG. 1.

For example, FIG. 3 illustrates the distal-to-proximal translation of the translation members 24. It can be appreciated that if the support members 22 limit the proximal movement of the proximal end 18 of the implant 16 while the translation members 24 are translated proximally, the implant 16 may both foreshorten (along the longitudinal axis of the implant 16) and also expand radially outward. The foreshortening and radial expansion of implant 16 can be seen by comparing the shape and position of the implant 16 in FIG. 2 to the shape and position of the implant 16 in FIG. 3. The position of the implant 16 shown in FIG. 3 may be described as a fully deployed positioned of the implant 16 (versus the partially deployed positioned of the implant 16 shown in FIG. 2). Further, FIG. 3 depicts the length of the fully deployed implant 16 as "$L_2$", whereby the distance $L_2$ is less than the distance $L_1$ shown in FIG. 2.

Additionally, it can be appreciated that the translation members 24 may be designed to be able extend in a proximal-to-distal direction such that they elongate (e.g., lengthen) the implant 16 (along its longitudinal axis). In other words, the implant 16 may be able to shift between a partially deployed position (shown in FIG. 2) and a fully deployed position (shown in FIG. 3) through the translation (either proximal or distal) of the translation members 24 along the longitudinal axis as the support members 22 limit the movement of the proximal end 18 of the implant 16.

It should be noted that the above description and illustrations regarding the arrangement, attachment features and operation of the support members 22 and the translation members 24 as they engage and function relative to the implant 16 is schematic. It can be appreciated that the design (e.g., arrangement, attachment features, operation, etc.) of the both support member 22 and the translation members 24 as they relate and function relative to the implant 16 may vary. For example, it is possible to design, arrange and operate the translation members 24 and the support members 22 in a variety of ways to achieve the partial and full deployment configurations of the implant 16 described herein.

In some examples, an operator may be able to manipulate the translation members 24 via the handle 17. For example, the handle 17 may include an actuation member designed to control the translation of the translation members 24. FIG. 2 illustrates that the handle member 17 may be coupled to the translation members 24 via an actuation shaft 30 and a coupling member 28. Additionally, FIG. 2 further illustrates that a distal end of actuation shaft 30 may be coupled to the proximal end of the coupling member 28. Further, while not shown in FIG. 2, it can be appreciated that the actuation shaft 30 may extend within the entire length of the inner catheter 14 from the coupling member 28 to the handle member 17.

For purposes of discussion herein, the inner catheter 14 may also be referred to as an inner member or liner 14. The liner 14 may include a number of different features shown in the figures described herein. For example, the liner 14 may include a lumen 25. Further, the translation members 24, coupler 28, actuation shaft 30, tubular guidewire member 34 (described below), and grouping coil 32 (described below) may be disposed within the lumen 25. These are just examples. The inner liner 14 may vary in form. For example, the inner liner 14 may include a single lumen, multiple lumens, or lack a lumen.

As described above, FIG. 2 and FIG. 3 illustrate the translation of translation members 24 in a distal-to-proximal direction (which shortens and radially expands the implant 16, as described above). However, FIG. 3 further illustrates that translation of the translation members 24 in a distal-to-proximal direction is accomplished by translation of the actuation shaft 30 and coupling member 28 within the lumen 25 of the inner catheter 14. For example, as the actuation shaft 30 is retracted (e.g., pulled proximally within lumen 25 of the inner catheter 14), it retracts the coupling member 28 proximally, which, in turn, retracts the translation members 24 in a proximal direction.

In some instances, it may be desirable to maintain the translation members 24 in a substantially linear configuration as they are translated within the lumen 25 of the inner catheter 14. In some examples, therefore, medical device system 10 may include a component designed to limit and/or prevent the translation members 24 from twisting around each other within the lumen 25 of the inner catheter 14. For example, FIG. 2 and FIG. 3 illustrate a grouping coil 32 wound around the translation members 24 such that the grouping coil 32 maintains the translation members 24 in a substantially liner configuration (and thereby limits and/or prevents the translation members 24 from twisting within lumen 25) as the translation members 24 are translated through the lumen 25 of the inner catheter 14.

FIG. 2 and FIG. 3 further illustrate that the proximal end of the grouping coil 32 may be positioned adjacent the distal end of the coupling member 28 and that the distal end of the grouping coil 32 may be positioned adjacent the distal end of the inner catheter 14. In particular, the distal end of the grouping coil 32 may be prevented from extending distally beyond the distal end of the inner catheter 14 by the containment fitting 29. In other words, the distal end of the grouping coil 32 may contact the containment fitting 29.

It can be further appreciated that the grouping coil 32 may be positioned within the lumen 25 of the inner catheter 14 such that the grouping coil 32 may elongate and shorten (e.g., a length of the grouping coil may adjust) within the lumen 25 of the inner catheter 14. For example, as the coupling member 28 is translated in a proximal direction (shown in FIG. 3 as compared to FIG. 2), the grouping coil 32 may elongate while continuing to group and/or contain the translation members 24 in a substantially linear configuration.

FIG. 2 and FIG. 3 further illustrate that the medical device system 10 may include a tubular guidewire member 34 extending within the lumen 25 of the inner catheter 14. The tubular guidewire member 34 may include a lumen which permits a guidewire to extend and translate therein. In other words, the medical device system 10 may be advanced to a target site within a body over a guidewire extending within the lumen of the tubular guidewire member 34. Further, the tubular guidewire member 34 may extend from the handle 17, through the lumen 25 of the inner member 14, through the implant 16 and terminate at a nosecone 36.

Figure 4:
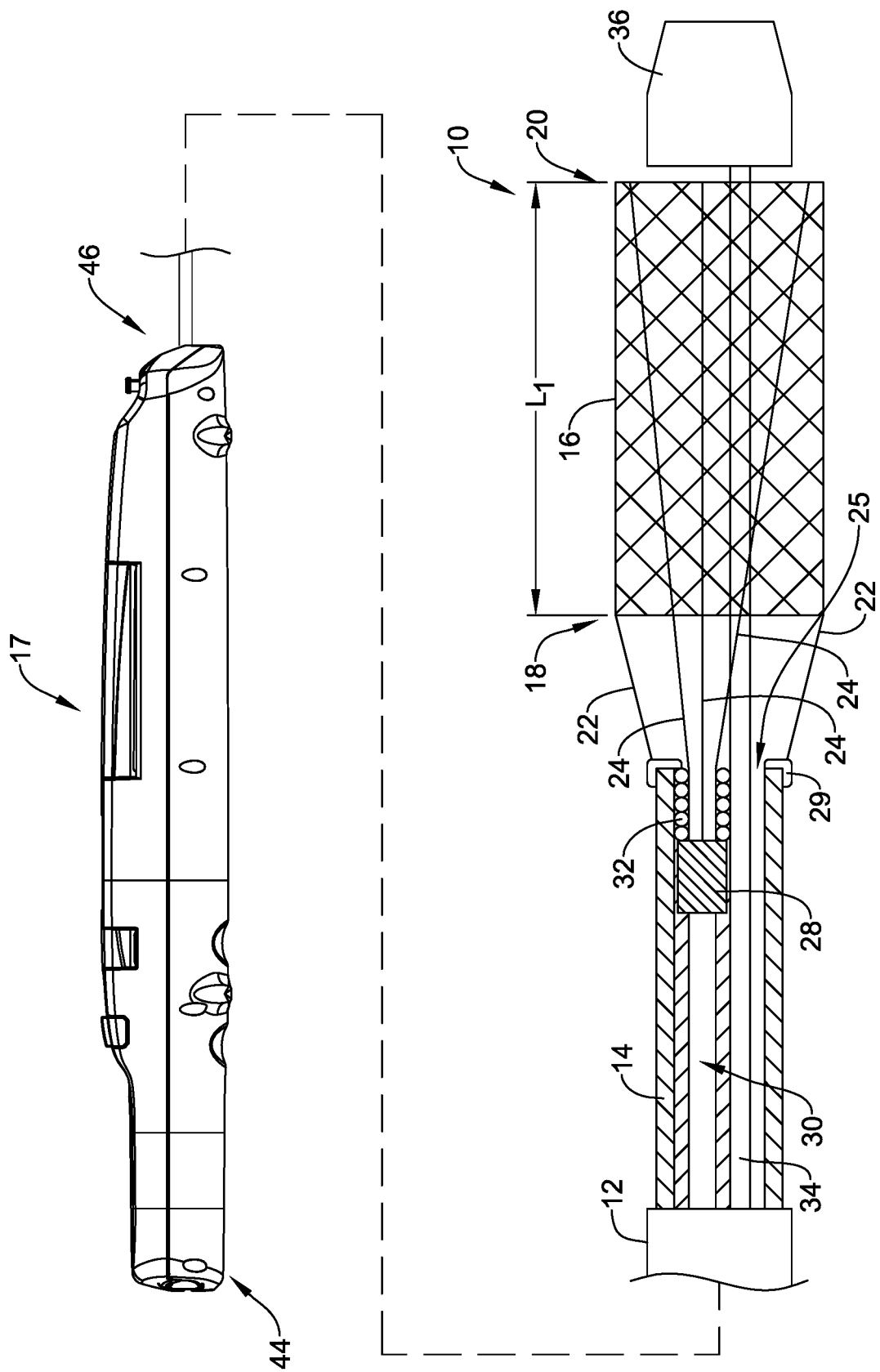
FIG. 4 is a partial cross-sectional view of a portion of the example medical device delivery system of FIG. 1.

It can be appreciated from the above discussion that the outer member 12, the inner shaft 14, the actuation shaft 30 (which is coupled to the translation members 24) and the tubular guidewire member 34 may all extend from a position adjacent the medical implant 16 to a position in which they enter the handle 17. For example, FIG. 4 shows that the outer sheath 12, the inner shaft 14, the actuation shaft 30 (which is coupled to the translation members 24) and the tubular guidewire member 34 may extend from an example medical implant 16 (which may be similar in form and function to the medical implant described above) and enter a distal end 46 of the handle member 17.

Figure 5:
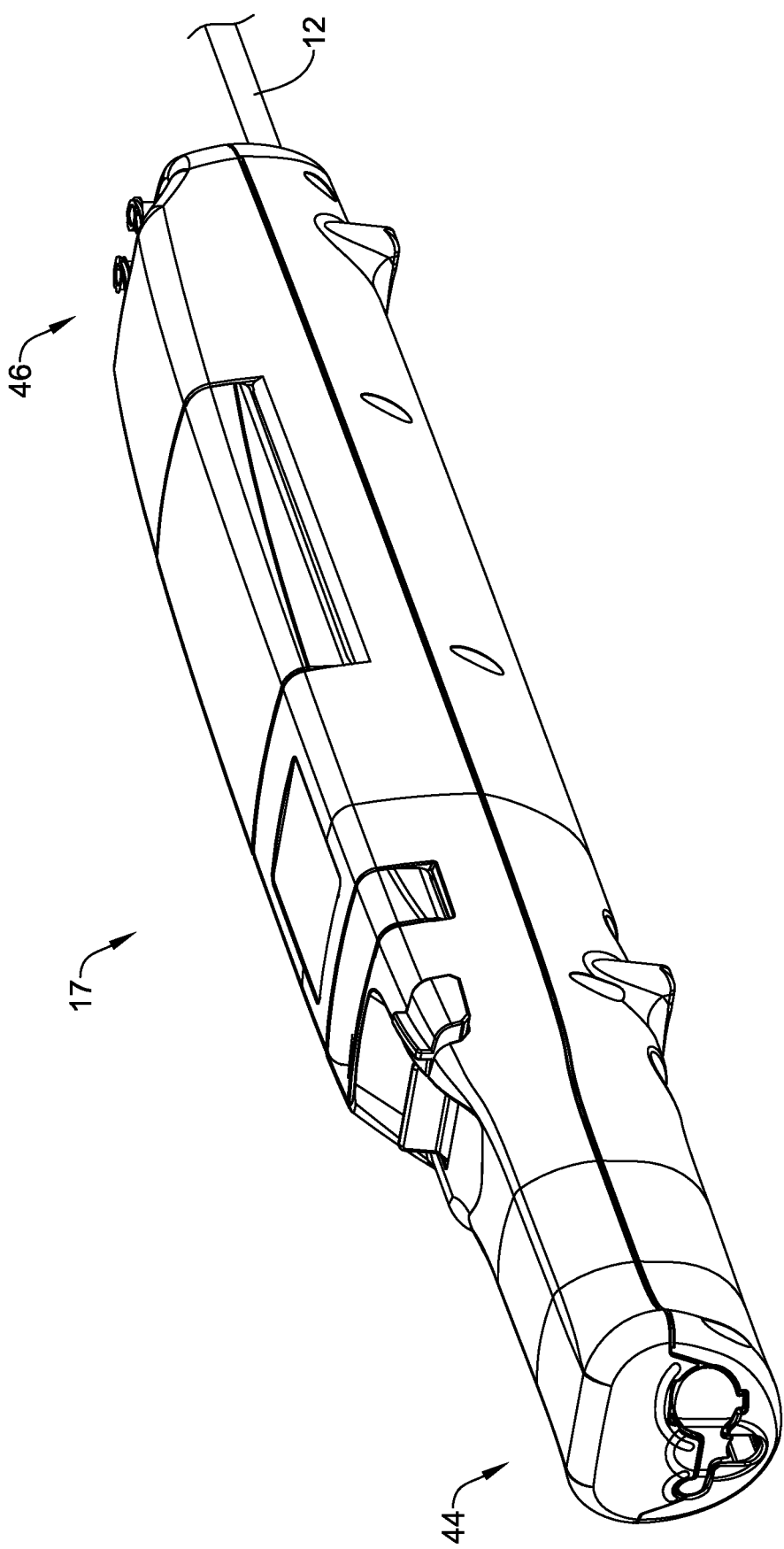
FIG. 5 is a perspective view of an example handle of the medical device delivery system of FIG. 1.

FIG. 5 illustrates a perspective view of the handle 17 described above. It can be appreciated the handle 17 may include a distal end region 46 and a proximal end region 44. Further, FIG. 5 illustrates the outer sheath 12 extending away from the distal end region 46 of the handle 17. As will be described in greater detail below, the outer shaft 12 may extend into the distal end region 46 of the handle 17 and attach to one or more internal components of the handle 17, whereby actuation of the one or more internal components may translate the outer shaft 12 relative to the implant 16. Additionally, several components of the medical device system 10 may extend within the outer sheath 12 and into the handle 17. For example, the actuation shaft 30 (which is coupled to the translation members 24 via the coupler 28) may extend with the outer sheath 12 and into the handle 17, whereby actuation of the actuation shaft 30 may translate the translation members 22 to shorten or lengthen the implant 16, as described above.

It can be appreciated that the handle 17 may generally include one or more electrical components (e.g., a power source, electrical motors, etc.) which serve as the primary mechanism for which the handle actuates one or more shafts (e.g., actuation shaft 20, outer sheath 12, etc.) to deploy the implant 16. In other words, the handle 17 may be designed such that after the implant is tracked to the deployment site with the heart, the user deploys the implant 16 via manipulation of the electrically powered handle 17. For example, the user may actuate a control switch (e.g., button, component, etc.) which sends power from one or more batteries to one or more electric motors. The user may then manipulate one or more buttons which may signal the electric motors to translate the one or more shafts (e.g., actuation shaft 20, outer sheath 12, etc.) in a proximal or distal direction to deliver, deploy, or, in certain instances, recapture the implant 16. As will be described in greater detail below, the handle 17 may include a first electric motor which is coupled to the outer sheath 12 (and therefore, translates the outer sheath 12 in a proximal or distal direction) and may also include a second electric motor which is coupled to the actuation shaft 30 (and therefore, translates the actuation shaft 30 and the translation member 22 in a proximal or distal direction).

However, it can be appreciated that while the primary operation of the handle 17 may be accomplished via the electrical power system, in the case of power loss, motor failure, or other mechanical failure, it may be desirable to allow the user to manipulate the outer sheath 12 and/or the actuation shaft 30 manually. In other words, it may be desirable to design the handle 17 to include a "bailout" mechanism whereby the user can disengage the electrical motors from the outer sheath 12 and/or the actuation shaft 30 and, using one or more ancillary drive tools, manually actuation the outer sheath 12 and/or the actuation shaft 30. The following description will describe a procedure in which a user may undertake to disengage (e.g., uncouple) the electrical motors from the outer sheath 12 and/or the actuation shaft 30 and, using one or more ancillary tools, manually actuation the outer sheath 12 and/or the actuation shaft 30.

Figure 6:
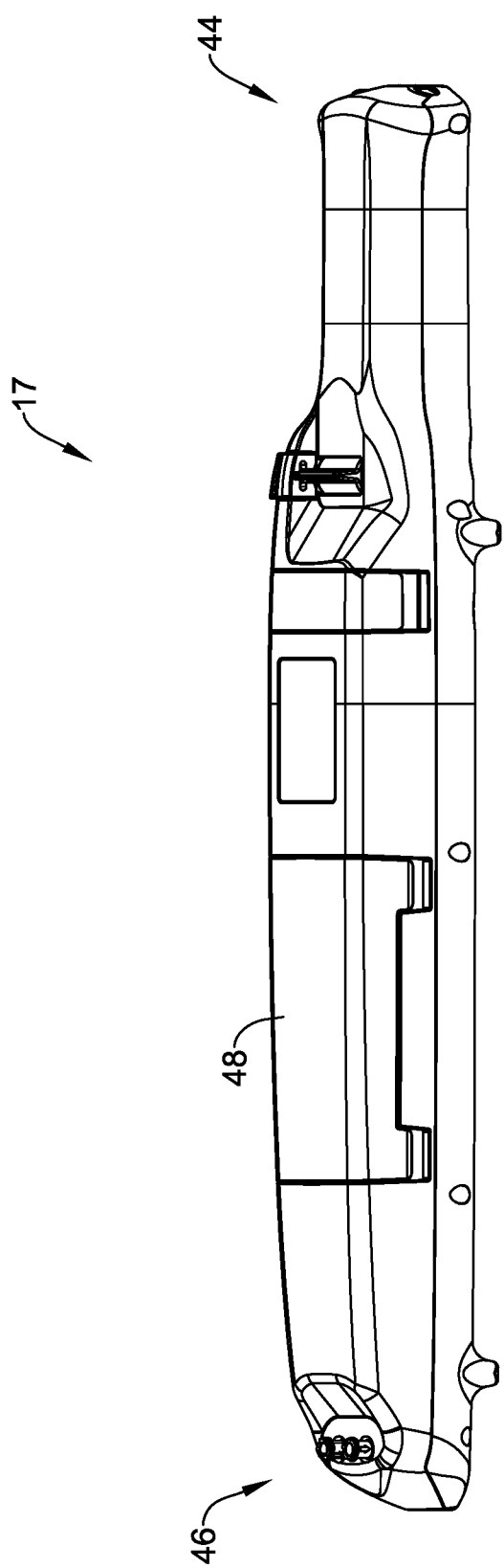
FIG. 6 is a side view of an example handle of the medical device delivery system of FIG. 1.
Figure 7:
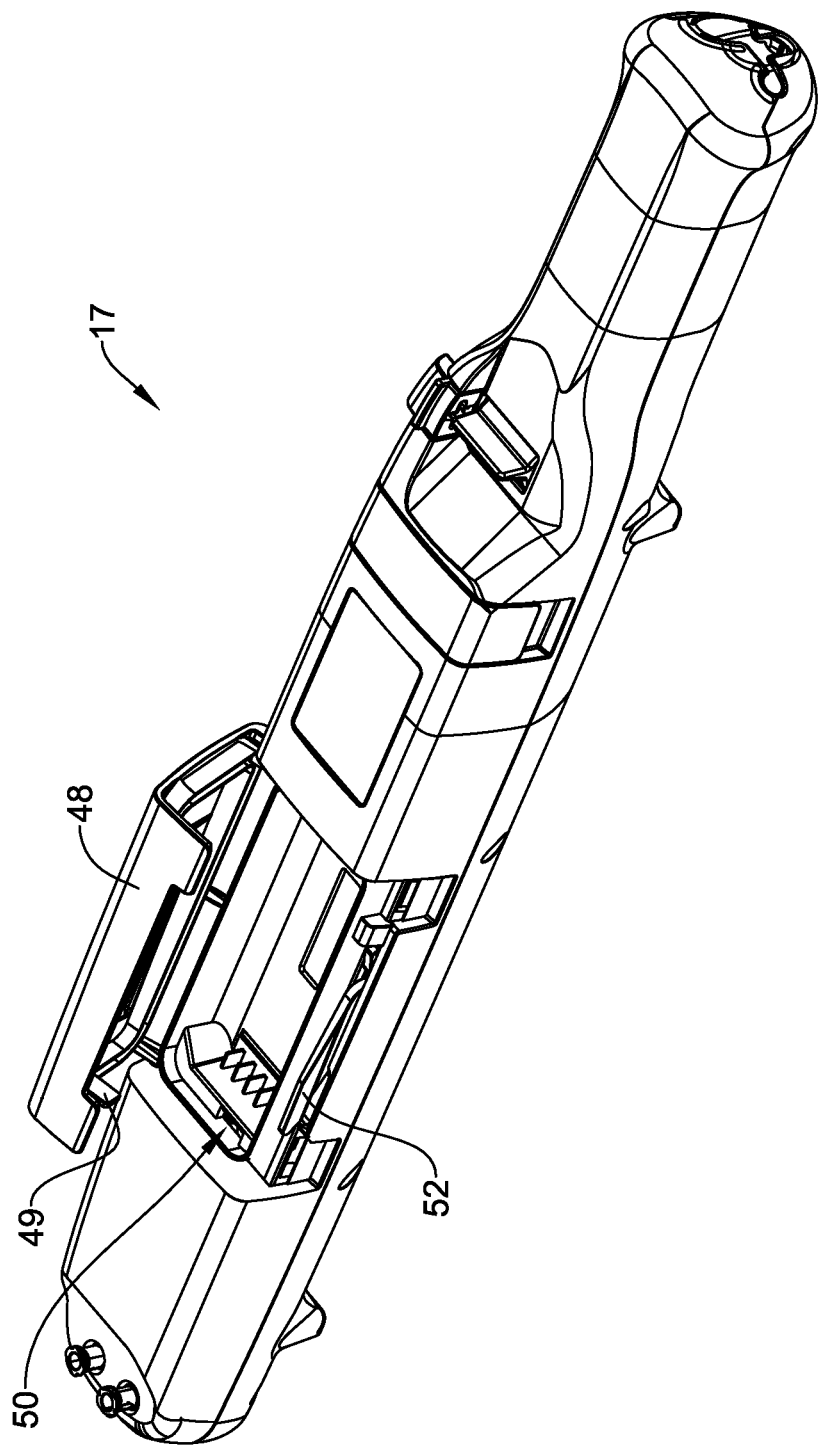
FIG. 7 is a perspective view of the example handle of the medical device delivery system of FIG. 6.

FIGS. 6-7 and illustrate an example first step user may undertake to disengage (e.g., uncouple) the electrical motors from the outer sheath 12 and/or the actuation shaft 30. Specifically, FIG. 6 illustrates a side view of the handle 17 shown in FIG. 5. For simplicity, the outer sheath 12 has been removed from the illustration, however, it can be appreciated that the outer sheath 12 (and the components extending therein), may enter the handle 17 at the distal end region 46, as shown in FIG. 5 (it is noted that, for illustrative purposes, the handle 17 has been flipped end-for-end in FIGS. 6-9 as compared to the illustration in FIGS. 1 and 4-6). Additionally, FIG. 6 illustrates the handle 17 may include a cover 48, which is located along a medial region of the handle 17 between the distal end region 46 and the proximal end region 44.

FIG. 7 illustrates a perspective view of the handle 17 shown in FIG. 6. Additionally, FIG. 7 illustrates that the cover 48 has been opened, revealing several inner components of the handle 17. Specifically, FIG. 7 illustrates the underside of the cover 48 may include a boss 49 which is designed to insert (e.g., engage) a recess 50. It can be appreciated that the recess 50 may include electrical circuitry which is coupled to a battery. Additionally, it can be appreciated that the handle 17 may be designed to require the boss 49 to be inserted into the recess 50 for power to flow from the battery to the remainder of the downstream electrical components of the handle 17. In other words, insertion of the boss 49 into the recess 50 may complete an electrical circuit, which allows power to flow from the battery, and accordingly, removing the boss 49 from the recess 50 may stop power from flowing from the battery to the remainder of the handle 17.

Therefore, it can be appreciated that a first step to disengage (e.g., uncouple) the electrical motors from the outer sheath 12 and/or the actuation shaft 30 may include a user to open the cover 48, thereby cutting power to the electrical motors of the handle 17. FIG. 7 also illustrates that the handle 17 may include an actuation lever 52 positioned adjacent to the recess 50. The function of the actuation lever 52 is described in greater detail below.

Figure 8:
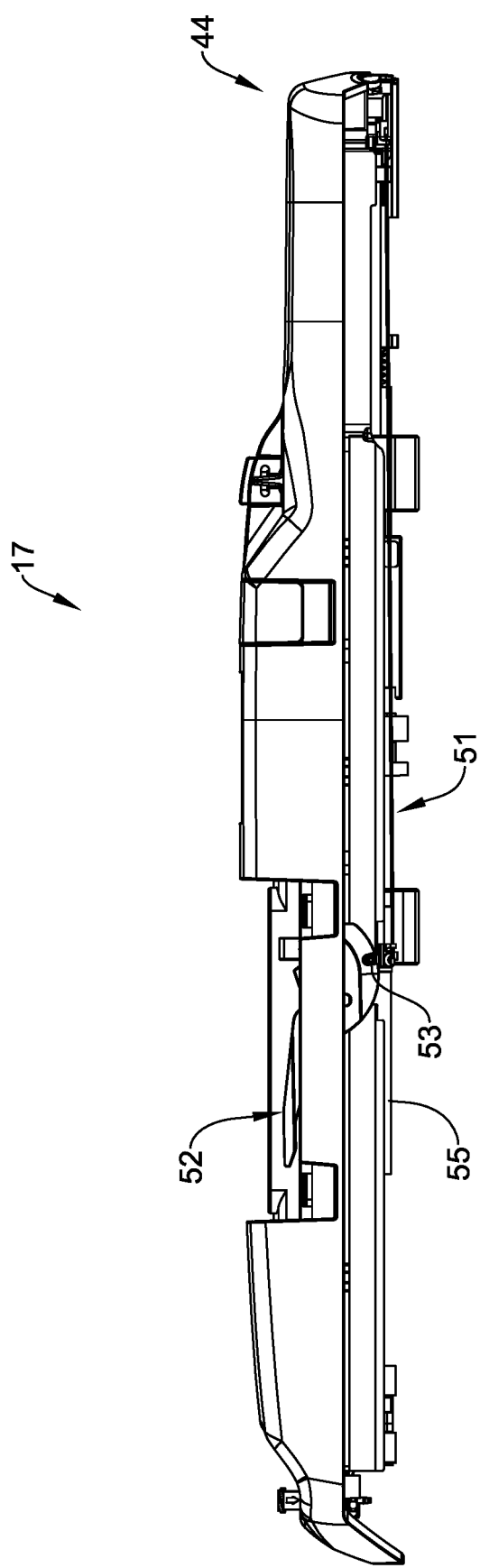
FIG. 8 is a side view of a portion of an example handle of the medical device delivery system of FIG. 1.
Figure 9:
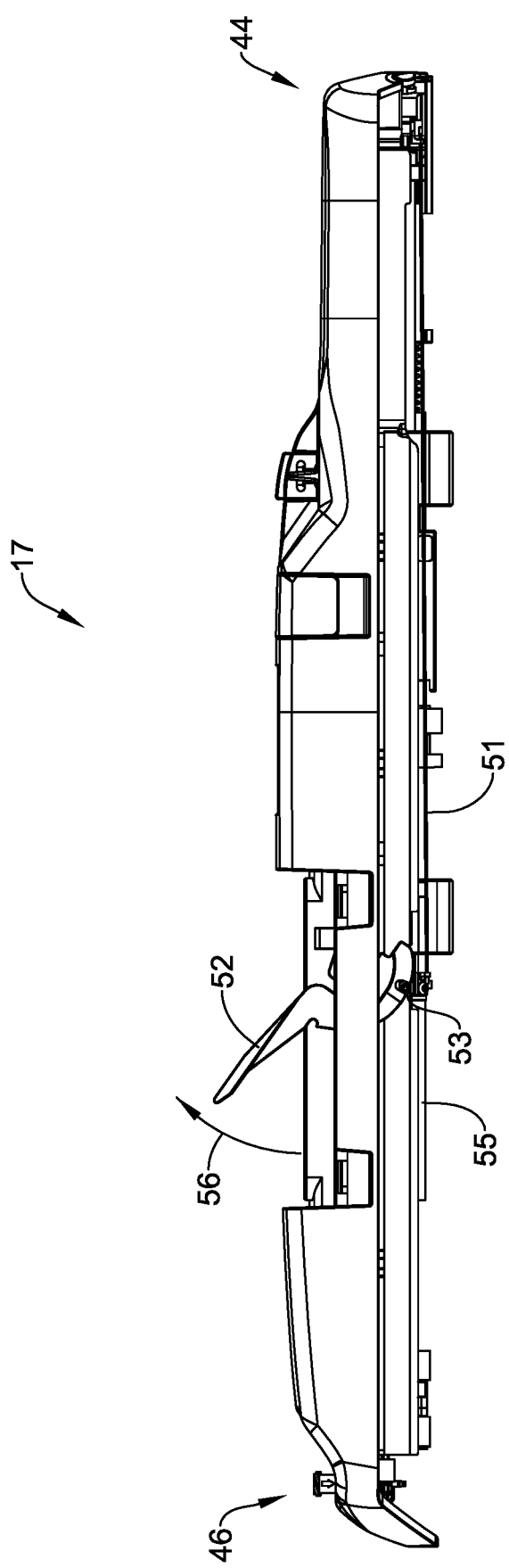
FIG. 9 is a side view of a portion of an example handle of the medical device delivery system of FIG. 1.

FIGS. 8-9 illustrates another example first step user may undertake to disengage (e.g., uncouple) the electrical motors from the outer sheath 12 and/or the actuation shaft 30. For example, FIGS. 8-9 illustrate a side view of the handle 17 described above. It is noted that, for clarity, both the cover 48 and a bottom portion of handle's 17 housing have been removed to further illustrate several inner components of the handle 17.

As described above, FIG. 8 illustrates that the handle 17 includes a bailout actuation lever 52 positioned adjacent to the recess 50 (described above). Further, FIG. 8 illustrates that the actuation lever 52 may be coupled to a translation member electric motor 55 via a dowel pin connection 53. As will be described in greater detail below, translation member electric motor 55 may also be coupled to a pull wire 54 which extends away from the electric motor 55 toward the proximal end region 44 of the handle 17.

FIG. 9 illustrates the actuation of the actuation lever 52. In particular, FIG. 9 illustrates that the actuation lever 52 may be actuated (as depicted by the arrow 56) in a clockwise direction from a first position (shown in FIG. 8) to a second position (shown in FIG. 9). Actuating the lever 52 may serve multiple functions. For example, actuating the lever 52 to the position shown in FIG. 9 may prevent the cover 48 (described above) from being inadvertently closed during the procedure in which the user is manually actuating the outer sheath 12 and/or the actuation shaft 30. It can be appreciated that if the cover 48 were to close, power would flow from the battery to the electric motors. Powering the electric motors during the manual actuation procedure is not desirable. Hence, the lever 52 is positioned such that when actuated, it prevents the cover 48 from being closed.

Additionally, actuation of the lever 52 may initiate the process of disengaging (e.g., uncoupling) the electric motors from the inner handle components which are coupled to the outer sheath 12 and the actuation shaft 30 (the inner components which are coupled to the outer sheath 12 and the actuation shaft 30 are illustrated and described in greater detail below). For example, FIG. 9 shows that actuation of the lever 52 may shift a pin connection 53 which couples the translation member motor 55 to the lever 52. Specifically, actuation of the lever 52 may shift the translation member motor 55 in a proximal-to-distal direction (e.g., away from the proximal end region 44 of the handle 17 toward the distal end region 46 of the handle 17). Further, shifting the motor 55 may also actuate a pull wire 51 which may be coupled to both the lever 52 and the motor 55. Therefore, actuation of the lever 52 may shift the motor 55 in a proximal-to-distal direction while also simultaneously pulling the pull wire 51 in a proximal-to-distal direction.

Figure 10:
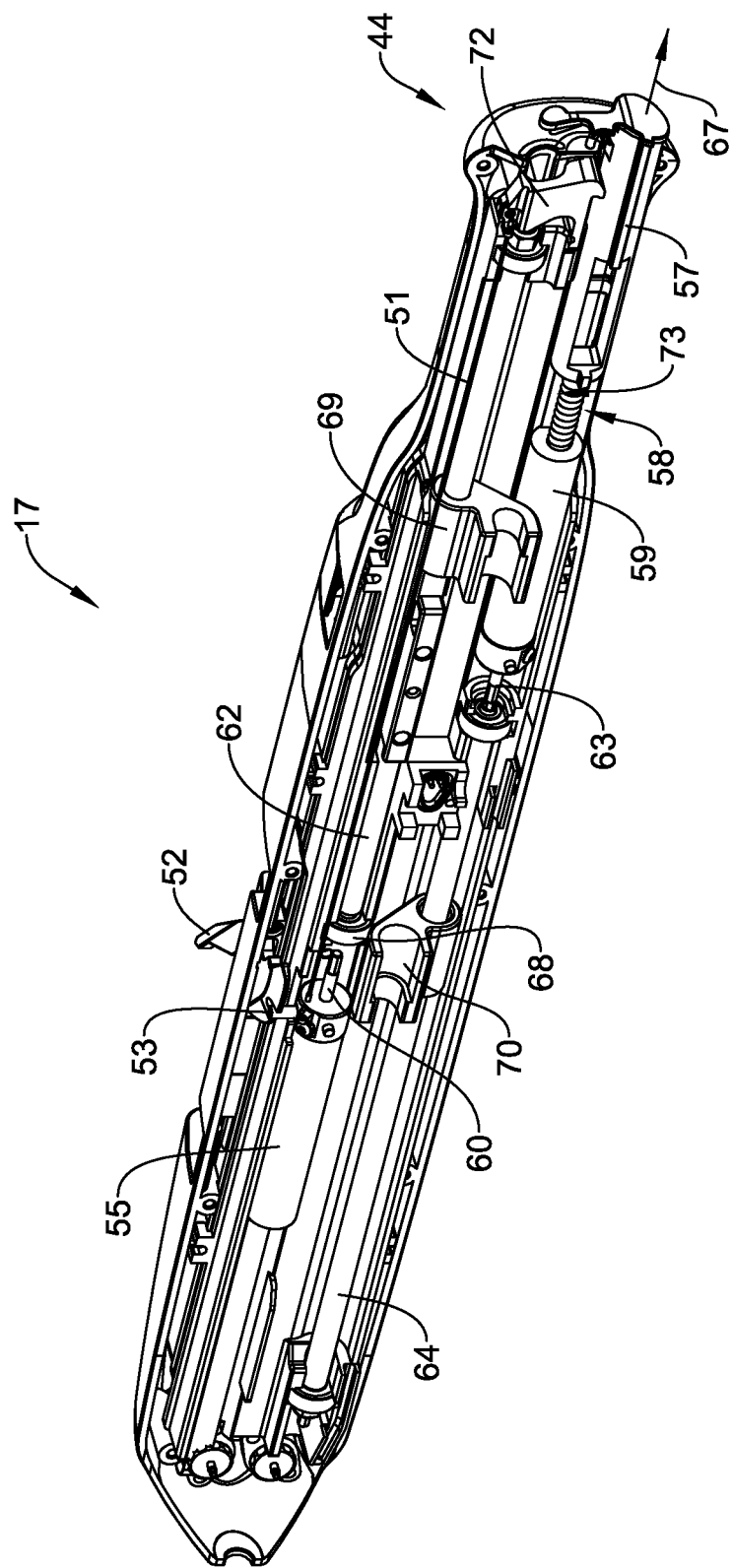
FIG. 10 is a perspective view of a portion of an example handle of the medical device delivery system of FIG. 1.

FIG. 10 illustrates a perspective view of the underside of the handle 17 (as described above, the bottom portion of the handle's 17 outer housing has been removed to reveal the interior handle componentry). FIG. 10 illustrates that after the lever 52 has been actuated (as described above), the translation member motor 55 shifts in a proximal-to-distal direction (FIG. 10 further illustrates the lever 52 engaged with the pin 53 of the motor 55) which disengages a drive pin 60 of the motor 55 from a proximal portion 68 of a translation member lead screw 62. At this point, the electric motor 55 may no longer rotate the translation member lead screw 62.

As will be described in greater detail below, when engaged, the electric translation motor 55 may rotate the translation member lead screw 62. Additionally, rotation of the translation member lead screw 62 may translate a translation member nut assembly 69 along the translation member lead screw 62. In other words, because the translation member nut assembly 69 may be threadedly coupled to the translation member lead screw 62, rotation of the translation member lead screw 62 may translate the translation member nut assembly 69 in either a distal-to-proximal direction or a proximal-to-distal direction along the translation member lead screw 62 (it can be appreciated that the nut assembly 69 may be shifted in different directions depending on which direction the translation member lead screw 62 is rotated).

While not shown in FIG. 10, it can be appreciated from FIG. 10 that the translation member nut assembly 69 may be coupled to the actuation shaft 30 shown in FIGS. 2-4. Accordingly, because the actuation shaft is coupled to the translation members 24 (shown in FIGS. 2-4), actuation of the translation member nut assembly 69 may translate the translation member 24, thereby shortening or lengthening the implant 16.

As described above, FIG. 10 illustrates the rotating the lever 52 may pull the pull wire 51 in a proximal-to-distal direction. Pulling the pull wire 51 in a proximal-to-distal direction may actuate a latch 72 which releases a bailout door 57. The bailout door 57 may be coupled to the outer sheath electric motor 59 via a flex circuit cable 73. Additionally, a spring 58 may be disposed between the bailout door 57 and the outer sheath motor 59. When the pull wire is retracted via actuation of the lever 52 (as described above) the latch 72 is flexed, thereby releasing the bailout door 57 and permitting the spring 58 to expand. It can be appreciated that expansion of the spring 58 pushes the bailout door 57 out of the proximal end 44 of the handle 17 (expansion of the spring 58 and the initial ejection of the bailout door 57 from the handle housing is depicted by reference numeral 67).

Similarly to that described above with respect to the translation member lead screw 62, when engaged, the outer sheath electric motor 59 may rotate the outer sheath lead screw 64 (FIG. 10 illustrates a output shaft 63 of the outer sheath electric motor 59 engaged with a proximal end portion of the outer sheath lead screw 64). Additionally, rotation of the outer sheath lead screw 64 may translate an outer sheath nut assembly 70 along the outer sheath lead screw 64. In other words, because the outer sheath nut assembly 70 may be threadedly coupled to the outer sheath lead screw 64, rotation of the outer sheath lead screw 64 may translate the outer sheath nut assembly 70 in either a distal-to-proximal direction or a proximal-to-distal direction along the outer sheath lead screw 64 (it can be appreciated that the nut assembly 70 may be shifted in different directions depending on which direction the outer sheath lead screw 64 is rotated).

It can be appreciated from the above discussion that after the translation member motor 55 and outer sheath motor 59 are disengaged from the translation member lead screw 62 and the outer sheath lead screw 64, respectively, manipulation of the implant 16 and/or the outer sheath 12 may need to be accomplished via manual manipulation of the translation member lead screw 62 and/or the outer sheath lead screw 64. Therefore, in order to access the translation member lead screw 62 and the outer sheath lead screw 64, the bailout door 57 (described herein) may need to be removed from the handle 17.

Figure 11:
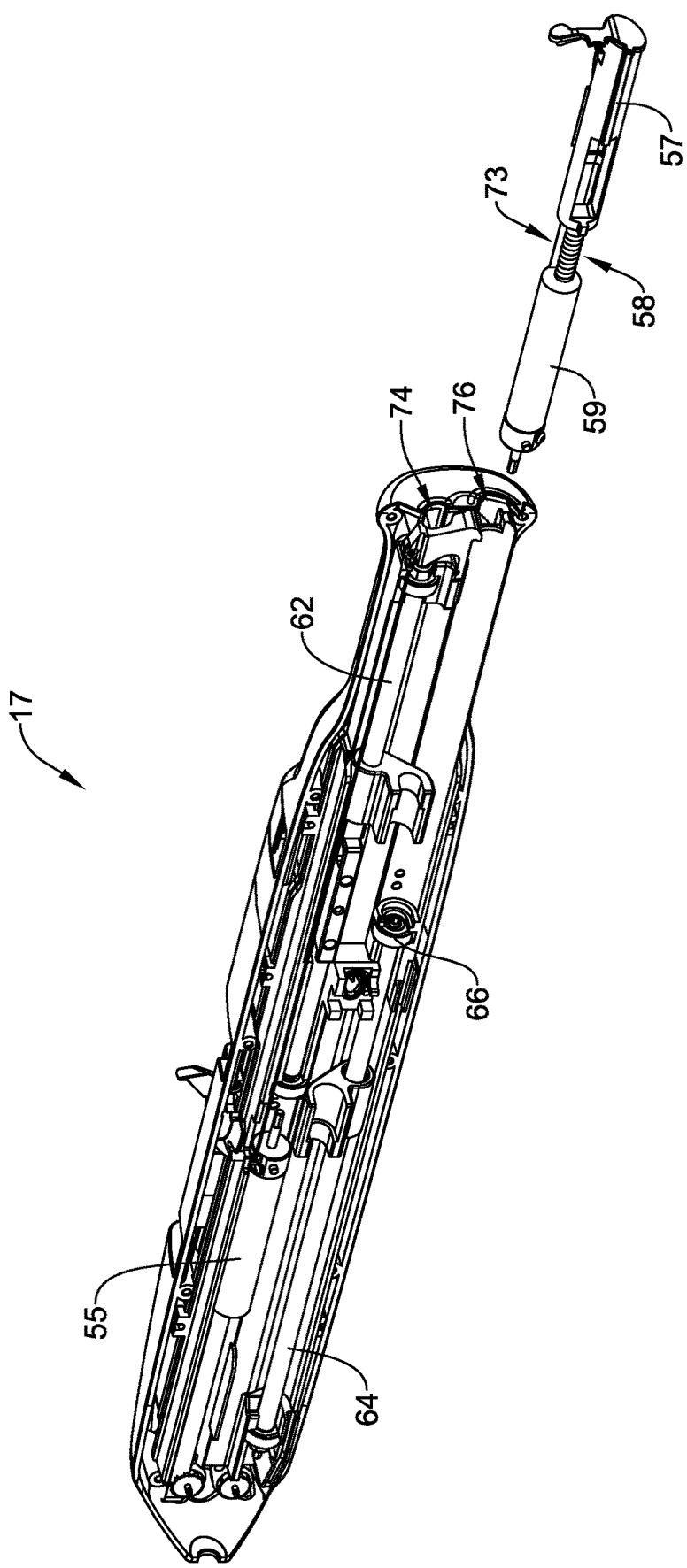
FIG. 11 is a perspective view of a portion of an example handle of the medical device delivery system of FIG. 1.

FIG. 11 illustrates the bailout door 57 removed from the handle 17. As described above, because the bailout door 57 is attached to the outer sheath electric motor 59 via the flex circuit cable 73, removing the bailout door 57 from the handle 17 may also remove the outer sheath electric motor 59 from the handle 17. It can be further appreciated from FIG. 11 that removing the bailout door 57 form the handle 17 may exposes a translation lead screw opening 74 and an outer sheath screw opening 76. It can be appreciated the translation lead screw opening 74 may permit access (via a first lead screw tool described below) to a proximal engagement portion of the translation member lead screw 62. Likewise, it can be appreciated the outer sheath lead screw opening 76 may permit access (via a second lead screw tool described below) to a proximal engagement portion 66 of the outer sheath lead screw 62.

Figure 12:
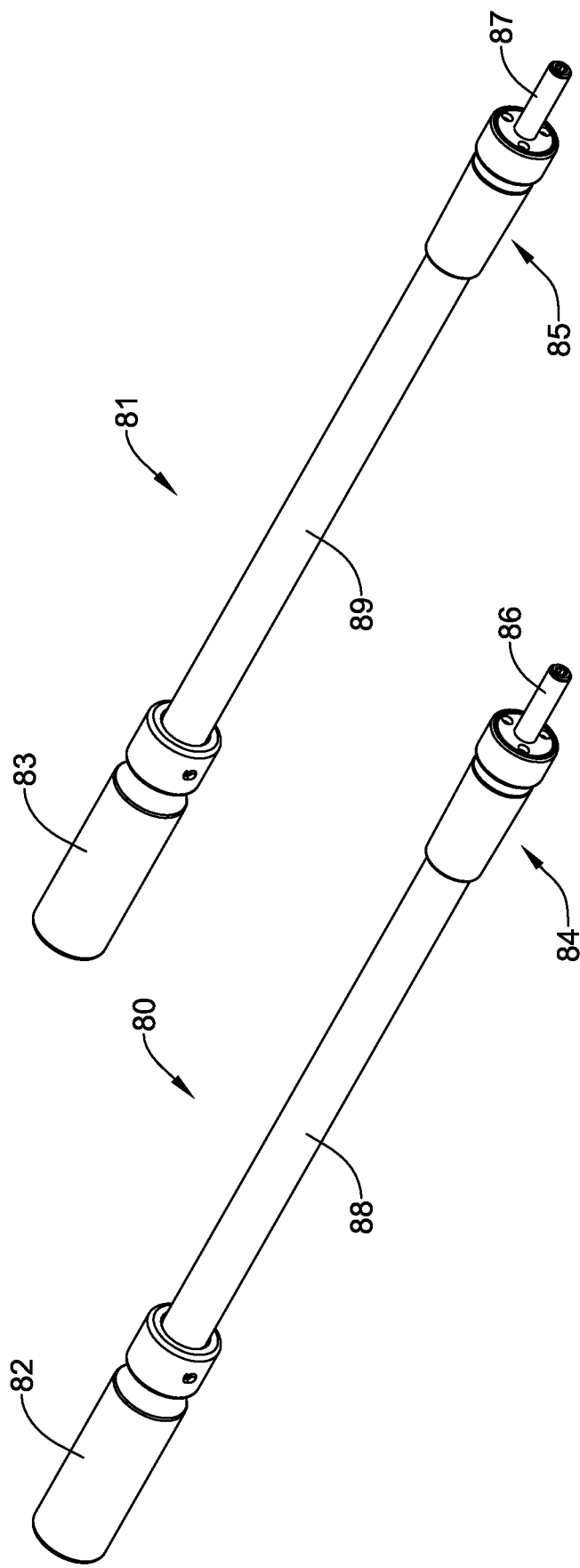
FIG. 12 is a perspective view of two example manual drive tools.

FIG. 12 illustrates a first lead screw tool 80 and a second lead screw tool 81. The first lead screw tool 80 may include a handle 82, a ratchet head portion 84 and a body portion 88 extending between the handle 82 and the ratchet head portion 84. The ratchet head portion 84 may further include a distal engagement tip 86. As will be illustrated in greater detail below, the ratchet head portion 84 of the first lead screw tool 80 may be removable from the body portion 88. Further, the second lead screw tool 81 may include a handle 83, a ratchet head portion 85 and a body portion 89 extending between the handle 83 and the ratchet head portion 85. The ratchet head portion 85 may further include a distal engagement tip 87. In some examples, the ratchet head portion 84 of the first lead screw tool 80 and the ratchet head portion 85 of the second lead screw tool 81 may be designed such that they may only rotate in one direction. Further details of the engagement of the first lead screw tool 80 with the translation member lead screw 62 and the engagement of the second lead screw tool 82 with the outer sheath lead screw 64 is described below.

As described above, after the translation member motor 55 has been disengaged from the translation member lead screw 62 and the outer sheath motor 59 has been disengaged from the outer sheath lead screw 64, a user may utilize both first lead screw tool 80 and/or the second lead screw tool 81 to manually rotate the translation member lead screw 62 and the outer sheath motor 59, respectively.

Figure 13:
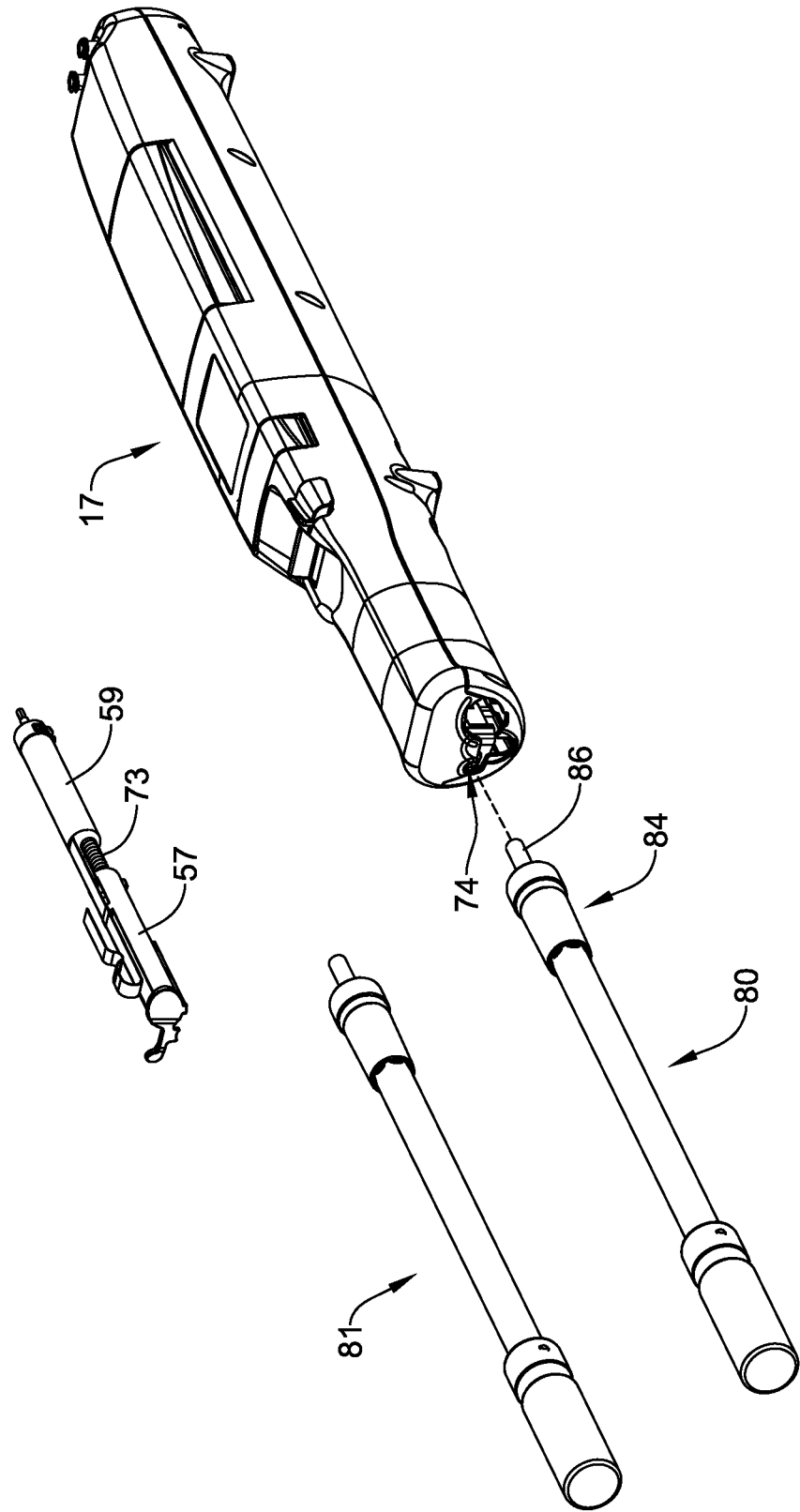
FIG. 13 is a perspective view of an example manual drive tool aligned with an example handle of the medical device delivery system of FIG. 1.

FIG. 13 illustrates an example step in which a user may utilize the first lead screw tool 80 to engage and manually rotate the translation member lead screw 62. As described above, FIG. 13 illustrates that the bailout door 57 has been removed from the handle 17. Because the bailout door 57 is coupled to the outer sheath electric motor 59 via the flex circuit 73, removing the bailout door 57 may also remove the outer sheath electric motor 59.

Additionally, FIG. 13 illustrates the first lead screw tool 80 aligned with the translation lead screw opening 74 (the second lead screw tool 81 is shown to distinguish it from the first lead screw tool 80). Either the first lead screw tool 80 or the second lead screw tool 81 may be inserted into the translation member lead screw opening 74 to engage the translation member lead screw 62. A more detailed discussion of the engagement of the first lead screw tool 80 or the second lead screw tool 81 with the translation lead screw 62 is set forth with respect to FIG. 14.

Figure 14:
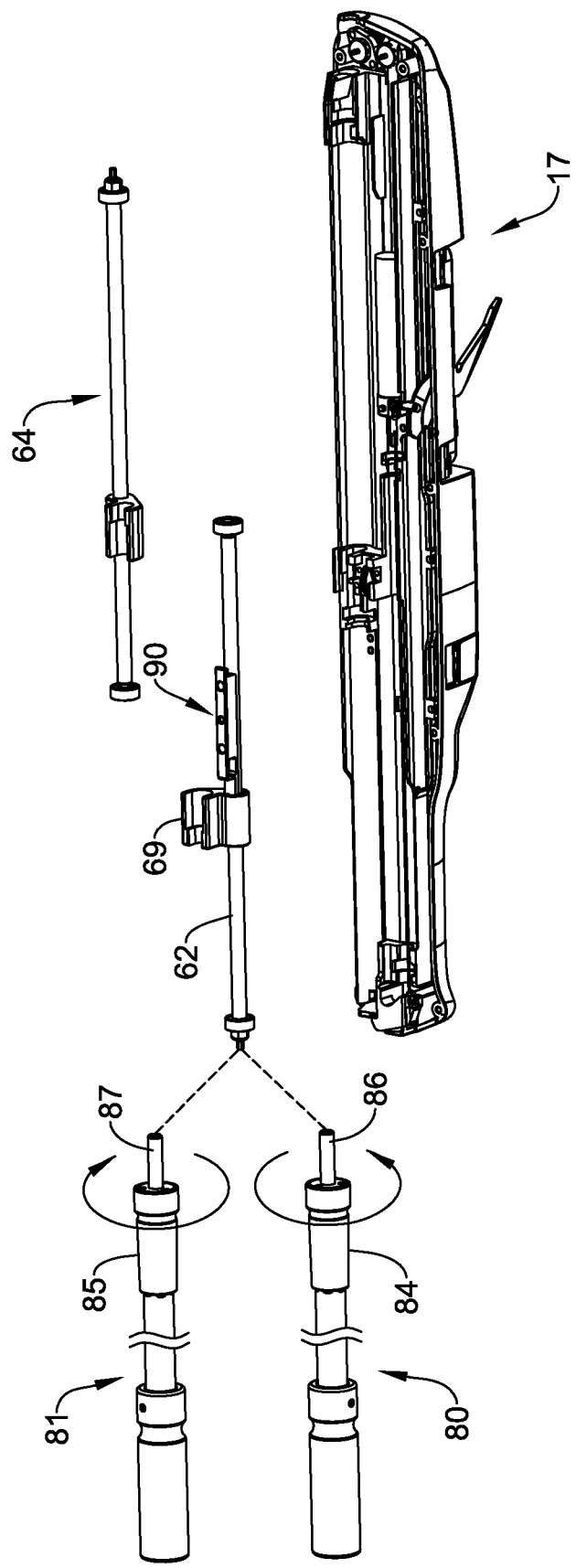
FIG. 14 is a perspective view of a portion of an example handle of the medical device delivery system of FIG. 1.

For simplicity, FIG. 14 illustrates the translation member lead screw 62 and the outer sheath lead screw 64 spaced away from the handle 17. Further, FIG. 14 illustrates that the first lead screw tool 80 may be inserted through the translation lead screw opening 74 to engage the distal engagement tip 86 into the proximal end region of the translation member lead screw 62. Rotation of the first lead screw tool 80 may rotate the translation member lead screw 62 such that the translation member nut assembly 69 is shifted in a proximal-to-distal direction relative to the implant 16. Shifting the translation member nut assembly 69 in a proximal-to-distal direction may shift the translation members 24 in a proximal-to-distal direction, thereby elongating the implant 16. The translation member nut assembly 69 may cease to translate when the translation member nut assembly contacts a translation member hard stop 90.

Alternatively, FIG. 14 illustrates that the second lead screw tool 81 may be inserted through the translation lead screw opening 74 (shown in FIG. 13) to engage its distal engagement tip 87 into the proximal end region of the translation member lead screw 62. Rotation of the second lead screw tool 81 may rotate the translation member lead screw 62 in an opposite direction as compared to the first lead screw tool 80, thereby shifting the translation member nut assembly 69 in a distal-to-proximal direction relative to the implant 16 (thereby shortening the implant 16). Shifting the translation member nut assembly 69 in a distal-to-proximal direction may shift the translation members 24 in a distal-to-proximal direction, thereby shortening the implant 16.

It can be appreciated that a user may decide whether to use either the first lead screw tool 80 to elongate the implant 16 (via turning the translation member lead screw 62 a first direction) or the second lead screw tool 81 to shorten the implant 16 (via turning the translation member lead screw 62 in the opposite direction versus the first lead screw too 80) depending on the user's desired outcome for a particular medical procedure. For example, in some procedures, a user may realize that, after the implant 16 has already been partially deployed, it may be necessary to recapture the implant 16 in the outer sheath 12. Recapturing a partially deployed implant 16 in the outer sheath 12 may permit the implant 16 to be repositioned and redeployed. Positioning the implant 16 in an optimal position to be recaptured by the outer sheath 12 may be accomplished by using the first lead screw tool 80 to shifting the translation members 24 in a proximal-to-distal direction (e.g., thereby lengthening the implant 16). The optimum lengthening of the implant 16 for recapture by the outer sheath 12 may be set to coincide with the translation member nut assembly 69 ceasing to translate when the translation member nut assembly 69 contacts the translation member hard stop 90.

Alternatively, if a user desires to fully deploy the implant 16, the user may utilize the second lead screw tool 81 to shift the translation members 24 in a distal-to-proximal direction (thereby shortening the implant 16) to a point at which the translation members 24 are disengaged from the implant 16 (e.g., the implant 16 is released from the delivery system 10).

As discussed above, after utilizing either the first lead screw tool 80 or the second lead screw tool 81 to manipulate the translation members (thereby either shortening the implant 12 for deployment or lengthening the implant 12 for recapture), the user may then utilize the first lead screw tool 80 to rotate the outer sheath lead screw 64 and translate the outer sheath 12. In examples when a user is choosing to recapture the implant 16, advancing the outer sheath 12 in a proximal-to-distal direction may result in the outer sheath 12 being advanced over the implant 12, thereby recapturing the implant 16 within the lumen of the outer sheath 12. Alternatively, after releasing the implant 12 from the delivery system 10, a user may advance the outer sheath 12 distally to swallow the remaining delivery system components (e.g., actuation shaft 30, translation members 24, etc.) within the lumen of the outer sheath 12 prior to removing the delivery system 10 from the patient's body.

Figure 15:
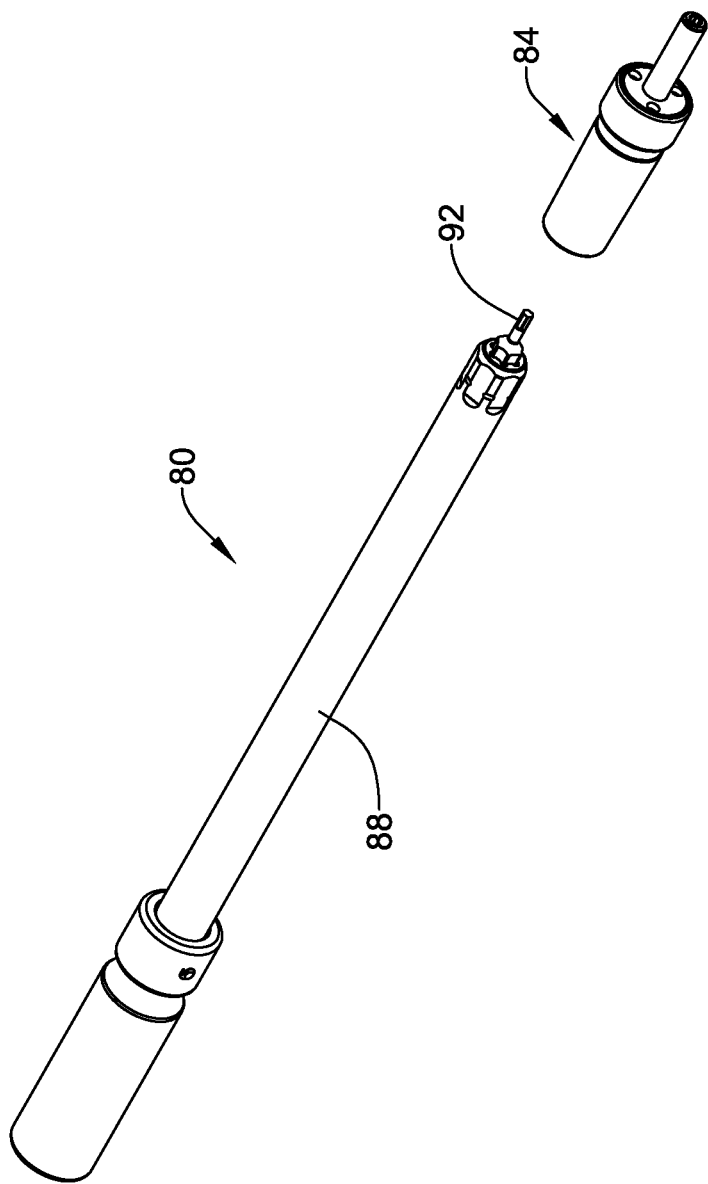
FIG. 15 is a perspective view of another example manual drive tool.

FIG. 15 illustrates the first lead screw tool 80 in a different configuration from that described above. Specifically, FIG. 15 illustrates that the first lead screw tool 80 may be designed such that the ratchet head 84 may be removed from the body portion 88. FIG. 15 further illustrates that the first lead screw tool 80 may include an additional engagement tip 92 which may be nested within the ratchet head 84. Additionally, the engagement tip 92 may be designed to engage the outer sheath lead screw 64.

Figure 16:
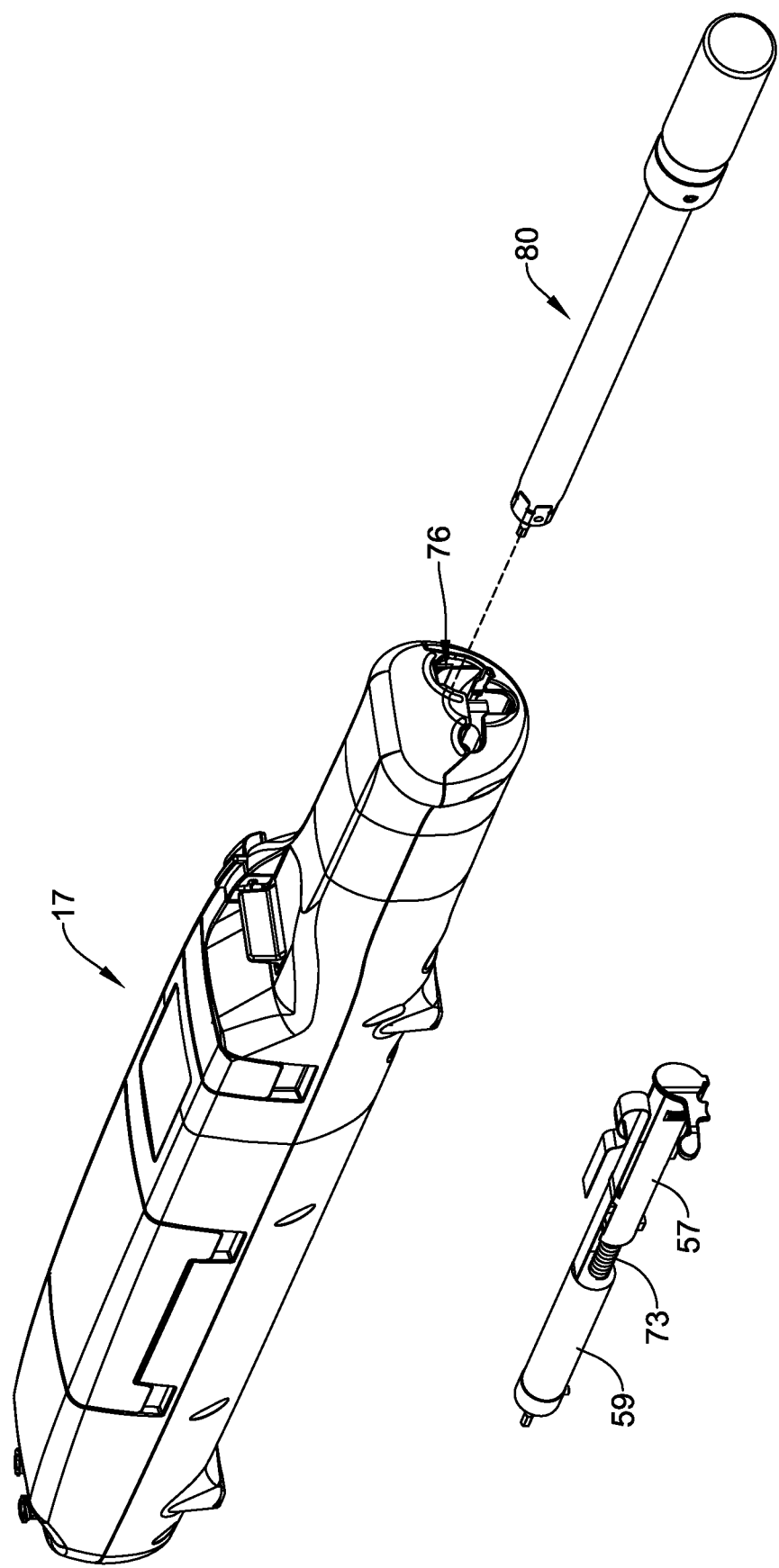
FIG. 16 is a perspective view of an example manual drive tool aligned with an example handle of the medical device delivery system of FIG. 1.

FIG. 16 illustrates an example step in which a user may utilize the first lead screw tool 80 to engage and manually rotate the outer sheath lead screw 64. As described above, FIG. 16 illustrates that the bailout door 57 has been removed from the handle 17. Because the bailout door 57 is coupled to the outer sheath electric motor 59 via the flex circuit 73, removing the bailout door 57 may also remove the outer sheath electric motor 59. Additionally, FIG. 16 illustrates the first lead screw tool 80 aligned with the outer sheath lead screw opening 76.

Figure 17:
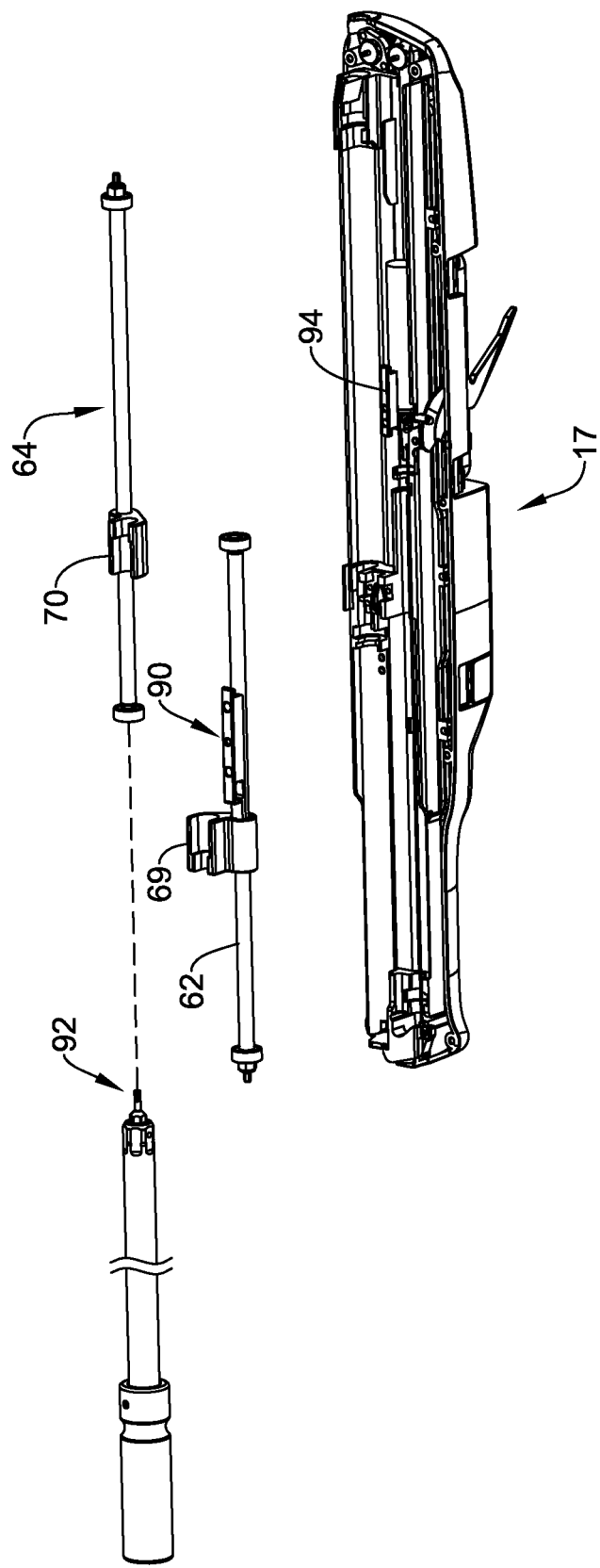
FIG. 17 is a perspective view of a portion of an example handle of the medical device delivery system of FIG. 1.

Similarly to FIG. 14, FIG. 17 illustrates the outer sheath lead screw 64 and the translation member lead screw 62 spaced away from the handle 17. Further, FIG. 17 illustrates that the first lead screw tool 80 may be inserted through the outer sheath lead screw opening 76 to engage the distal engagement tip 92 into the proximal end region of the outer sheath lead screw 64. Rotation of the first lead screw tool 80 may rotate the outer sheath lead screw 64 such that the outer sheath nut assembly 70 is shifted in a proximal-to-distal direction relative to the implant 16. Shifting the outer sheath nut assembly 70 in a proximal-to-distal direction may shift the outer sheath 12 in a proximal-to-distal direction, thereby permitting the outer sheath 12 to recapture the implant 12 or swallow the remaining delivery system components. The outer sheath nut assembly 70 may cease to translate when the outer sheath nut assembly 70 contacts a distal stop 94 located in the handle 17.

The materials that can be used for the various components of the medical devices and/or systems 10 and 200 disclosed herein may include those commonly associated with medical devices. However, this is not intended to limit the devices and methods described herein, as the discussion may be applied to other components of the medical devices and/or systems 10, 200 disclosed herein including the various shafts, liners, components described relative thereto.

The medical device 10, 200 may be made from a metal, metal alloy, polymer (some examples of which are disclosed below), a metal-polymer composite, ceramics, combinations thereof, and the like, or other suitable material. Some examples of suitable polymers may include polytetrafluoroethylene (PTFE), ethylene tetrafluoroethylene (ETFE), fluorinated ethylene propylene (FEP), polyoxymethylene (POM, for example, DELRIN® available from DuPont), polyether block ester, polyurethane (for example, Polyurethane 85A), polypropylene (PP), polyvinylchloride (PVC), polyether-ester (for example, ARNITEL® available from DSM Engineering Plastics), ether or ester based copolymers (for example, butylene/poly(alkylene ether) phthalate and/or other polyester elastomers such as HYTREL® available from DuPont), polyamide (for example, DURETHAN® available from Bayer or CRISTAMID® available from Elf Atochem), elastomeric polyamides, block polyamide/ethers, polyether block amide (PEBA, for example available under the trade name PEBAX®), ethylene vinyl acetate copolymers (EVA), silicones, polyethylene (PE), high density polyethylene (HDPE), polyester, Marlex high-density polyethylene, Marlex low-density polyethylene, linear low density polyethylene (for example REXELL®), ultra-high molecular weight (UHMW) polyethylene, polypropylene, polybutylene terephthalate (PBT), polyethylene terephthalate (PET), polytrimethylene terephthalate, polyethylene naphthalate (PEN), polyetheretherketone (PEEK), polyimide (PI), polyetherimide (PEI), polyphenylene sulfide (PPS), polyphenylene oxide (PPO), poly paraphenylene terephthalamide (for example, KEVLAR®), polysulfone, nylon, nylon-12 (such as GRILAMID® available from EMS American Grilon), perfluoro(propyl vinyl ether) (PFA), ethylene vinyl alcohol, polyolefin, polystyrene, epoxy, polyvinylidene chloride (PVdC), poly(styrene-b-isobutylene-b-styrene) (for example, SIBS and/or SIBS 50A), polycarbonates, ionomers, biocompatible polymers, other suitable materials, or mixtures, combinations, copolymers thereof, polymer/metal composites, and the like. In some embodiments the sheath can be blended with a liquid crystal polymer (LCP).

Some examples of suitable metals and metal alloys include stainless steel, such as 304V, 304L, and 316LV stainless steel; mild steel; nickel-titanium alloy such as linear-elastic and/or super-elastic nitinol; other nickel alloys such as nickel-chromium-molybdenum alloys (e.g., UNS: N06625 such as INCONEL® 625, UNS: N06022 such as HASTELLOY® C-22®, UNS: N10276 such as HASTELLOY® C276®, other HASTELLOY® alloys, and the like), nickel-copper alloys (e.g., UNS: N04400 such as MONEL® 400, NICKELVAC® 400, NICORROS® 400, and the like), nickel-cobalt-chromium-molybdenum alloys (e.g., UNS: R30035 such as MP35-N® and the like), nickel-molybdenum alloys (e.g., UNS: N10665 such as HASTELLOY® ALLOY B2®), other nickel-chromium alloys, other nickel-molybdenum alloys, other nickel-cobalt alloys, other nickel-iron alloys, other nickel-copper alloys, other nickel-tungsten or tungsten alloys, and the like; cobalt-chromium alloys; cobalt-chromium-molybdenum alloys (e.g., UNS: R30003 such as ELGILOY®, PHYNOX®, and the like); platinum enriched stainless steel; titanium; combinations thereof; and the like; or any other suitable material.

In at least some embodiments, portions or all of the medical device 10, 200 may also be doped with, made of, or otherwise include a radiopaque material. Radiopaque materials are understood to be materials capable of producing a relatively bright image on a fluoroscopy screen or another imaging technique during a medical procedure. This relatively bright image aids the user of the medical device 10, 200 in determining its location. Some examples of radiopaque materials can include, but are not limited to, gold, platinum, palladium, tantalum, tungsten alloy, polymer material loaded with a radiopaque filler, and the like. Additionally, other radiopaque marker bands and/or coils may also be incorporated into the design of the medical device 10, 200 to achieve the same result.

In some embodiments, a degree of Magnetic Resonance Imaging (MM) compatibility is imparted into the medical device 10, 200. For example, the medical device 10, 200 may include a material that does not substantially distort the image and create substantial artifacts (e.g., gaps in the image). Certain ferromagnetic materials, for example, may not be suitable because they may create artifacts in an MM image. The medical device 10, 200 may also be made from a material that the Mill machine can image. Some materials that exhibit these characteristics include, for example, tungsten, cobalt-chromium-molybdenum alloys (e.g., UNS: R30003 such as ELGILOY®, PHYNOX®, and the like), nickel-cobalt-chromium-molybdenum alloys (e.g., UNS: R30035 such as MP35-N® and the like), nitinol, and the like, and others.

It should be understood that this disclosure is, in many respects, only illustrative. Changes may be made in details, particularly in matters of shape, size, and arrangement of steps without exceeding the scope of the disclosure. This may include, to the extent that it is appropriate, the use of any of the features of one example embodiment being used in other embodiments. The disclosure's scope is, of course, defined in the language in which the appended claims are expressed.

What is claimed is:

1. A system for delivering an implantable medical device, comprising:
    a handle housing having a distal end region, a proximal end region and an inner cavity;

a power supply disposed within the cavity of the handle, the power supply coupled to a first electric drive motor and a second electric drive motor;

a first linear drive screw coupled to both the first electric drive motor and an actuation shaft within the cavity of the handle;

a second linear drive screw coupled to both the second electric drive motor and an outer shaft within the cavity of the handle;

an inner cavity access door disposed on a proximal end of the handle housing;

a release lever coupled to the handle, the first electric drive motor, and a pull wire assembly;

wherein the first electric drive motor is configured to be disengaged from first linear drive screw such that a first drive tool can be used to engage the first linear drive screw;

wherein the inner cavity access door is configured to be removed such that the first linear drive screw and the second linear drive screw may be accessed by the first drive tool;

wherein the second electric drive motor is configured to be disengaged from second linear drive screw such that the first drive tool can be used to engage the second linear drive screw;

wherein the inner cavity access door is coupled to the second electric drive motor such that removal of the inner cavity access door from the handle housing disengages the second electric drive motor from the second linear drive screw.

2. The system of claim 1, wherein the pull wire assembly includes a pull wire attached to a latch, and wherein the latch is coupled to the inner cavity access door.

3. The system of claim 2, wherein the latch is configured to shift between a first position and a second position, and wherein the latch prevents the inner cavity access door from being released from the handle housing in the first position, and wherein shifting the latch from the first position to the second position releases the inner cavity access door from the handle housing.

4. The system of claim 3, wherein actuation of the release lever actuates the pull wire such that the pull wire shifts the latch from the first position to the second position.

5. The system of claim 1, wherein engaging the first drive tool with the first linear drive screw allows the first drive tool to manually rotate the first linear drive screw in a first direction.

6. The system of claim 5, wherein manual rotation of the first linear drive screw in the first direction shifts the actuation shaft in a distal-to-proximal direction.

7. The system of claim 6, wherein engaging a second drive tool with the first linear drive screw allows the second drive tool to manually rotate the first linear drive screw in a second direction different than the first direction, and wherein the manual rotation of the first linear drive screw in the second direction shifts the actuation shaft in a proximal-to-distal direction.

8. The system of claim 1, wherein the system further includes the first drive tool which includes a first ratchet head, and wherein the first ratchet head is removable from a body portion of the first drive tool, and wherein removing the first ratchet head from the first drive tool uncovers an engagement head.

9. The system of claim 8, wherein the engagement head of the first drive tool is configured to engage the second linear drive screw.

10. The system of claim 9, wherein engaging the engagement head of the first drive tool with the second linear drive screw allows the first drive tool to manually rotate the second linear drive screw a first direction, and wherein the manual rotation of the second linear drive screw in the first direction shifts the outer shaft in a proximal-to-distal direction.

* * * * *